(12) United States Patent
Swanson et al.

(10) Patent No.: US 9,550,327 B2
(45) Date of Patent: *Jan. 24, 2017

(54) LIQUEFIER ASSEMBLY FOR USE IN EXTRUSION-BASED ADDITIVE MANUFACTURING SYSTEMS

(71) Applicant: Stratasys, Inc., Eden Prairie, MN (US)

(72) Inventors: William J. Swanson, St. Paul, MN (US); Kevin C. Johnson, Minneapolis, MN (US); Timothy A. Hjelsand, Waconia, MN (US); J. Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/691,328

(22) Filed: Apr. 20, 2015

(65) Prior Publication Data
US 2015/0224713 A1 Aug. 13, 2015

Related U.S. Application Data

(63) Continuation of application No. 14/147,065, filed on Jan. 3, 2014, now Pat. No. 9,022,771, which is a
(Continued)

(51) Int. Cl.
*B29C 67/00* (2006.01)
*B29C 47/00* (2006.01)
(Continued)

(52) U.S. Cl.
CPC ....... *B29C 67/0085* (2013.01); *B29C 47/0002* (2013.01); *B29C 47/0014* (2013.01);
(Continued)

(58) Field of Classification Search
CPC .................. B29C 67/0055; B29C 47/0852
(Continued)

(56) References Cited

U.S. PATENT DOCUMENTS 2,889,581 A 6/1959 Vanderhoof
3,175,772 A 3/1965 Marshall
(Continued)

FOREIGN PATENT DOCUMENTS

EP 423388 A1 4/1991
EP 0833237 A2 4/1998
GB 816016 B1 7/1959

OTHER PUBLICATIONS

Taiwan Office Action dated Apr. 1, 2015 for corresponding Taiwan Application No. 100133994, filed Sep. 21, 2011.
(Continued)

*Primary Examiner* — Nahida Sultana
(74) *Attorney, Agent, or Firm* — Peter J. Ims; Westman, Champlin & Koehler, P.A.

(57) ABSTRACT

A liquefier assembly for use in an extrusion-based additive manufacturing system, the liquefier assembly comprising a downstream portion having a first average inner cross-sectional area, and an upstream having a second average inner cross-sectional area that is less than the first inner cross-sectional area, the upstream portion defining a shoulder configured to restrict movement of a melt meniscus of a consumable material.

19 Claims, 12 Drawing Sheets

Related U.S. Application Data continuation of application No. 12/888,087, filed on Sep. 22, 2010, now Pat. No. 8,647,098.

(51) Int. Cl.
| | |
|---|---|
| *B29C 47/08* | (2006.01) |
| *B29C 47/86* | (2006.01) |
| *B33Y 30/00* | (2015.01) |
| *B29L 9/00* | (2006.01) |

(52) U.S. Cl.
CPC ...... *B29C 47/0852* (2013.01); *B29C 47/0864* (2013.01); *B29C 47/862* (2013.01); *B29C 67/0055* (2013.01); *B29C 2947/92571* (2013.01); *B29L 2009/00* (2013.01); *B33Y 30/00* (2014.12)

(58) Field of Classification Search
USPC .... 264/308, 113, 40.6, 176.1; 425/190, 191, 425/192 R, 143–144, 113
See application file for complete search history.

(56) References Cited

U.S. PATENT DOCUMENTS

| | | | |
|---|---|---|---|
| 4,457,685 A * | 7/1984 | Huang | B30B 11/221 264/177.16 |
| 4,749,347 A | 6/1988 | Valavaara | |
| 4,797,313 A | 1/1989 | Stolk et al. | |
| 5,008,056 A | 4/1991 | Kurtz et al. | |
| 5,121,329 A | 6/1992 | Crump | |
| 5,169,081 A | 12/1992 | Goedderz | |
| 5,303,141 A | 4/1994 | Batchelder et al. | |
| 5,312,224 A | 5/1994 | Batchelder et al. | |
| 5,340,433 A * | 8/1994 | Crump | B22F 3/115 118/202 |
| 5,342,687 A | 8/1994 | Iwai et al. | |
| 5,503,785 A | 4/1996 | Crump et al. | |
| 5,567,463 A * | 10/1996 | Schaaf | A23P 1/12 366/87 |
| 5,738,817 A | 4/1998 | Danforth et al. | |
| 5,747,102 A | 5/1998 | Smith et al. | |
| 5,764,521 A | 6/1998 | Batchelder et al. | |
| 5,866,058 A | 2/1999 | Batchelder et al. | |
| 5,889,064 A | 3/1999 | Hermann | |
| 5,900,207 A | 5/1999 | Danforth et al. | |
| 5,939,008 A | 8/1999 | Comb et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,030,199 A | 2/2000 | Tseng | |
| 6,054,077 A | 4/2000 | Comb et al. | |
| 6,067,480 A | 5/2000 | Stuffle et al. | |
| 6,070,107 A | 5/2000 | Lombardi et al. | |
| 6,085,957 A | 7/2000 | Zinniel et al. | |
| 6,129,872 A | 10/2000 | Jang | |
| 6,161,592 A | 12/2000 | Yamamoto et al. | |
| 6,228,923 B1 | 5/2001 | Lombardi et al. | |
| 6,234,995 B1 | 5/2001 | Peacock, III | |
| 6,251,318 B1 | 6/2001 | Arentsen et al. | |
| 6,257,517 B1 | 7/2001 | Babish et al. | |
| 6,521,147 B1 | 2/2003 | Arentsen et al. | |
| 6,530,765 B1 | 3/2003 | Zdrahala et al. | |
| 6,547,995 B1 | 4/2003 | Comb | |
| 6,645,412 B2 | 11/2003 | Priedeman, Jr. | |
| 6,685,866 B2 | 2/2004 | Swanson et al. | |
| 6,695,810 B2 | 2/2004 | Peacock, III et al. | |
| 6,722,872 B1 | 4/2004 | Swanson et al. | |
| 6,730,252 B1 | 5/2004 | Teoh et al. | |
| 6,749,414 B1 | 6/2004 | Hanson et al. | |
| 6,790,403 B1 | 9/2004 | Priedeman, Jr. et al. | |
| 6,814,907 B1 | 11/2004 | Comb | |
| 6,869,559 B2 | 3/2005 | Hopkins | |
| 6,923,634 B2 | 8/2005 | Swanson et al. | |
| 6,998,087 B1 | 2/2006 | Hanson et al. | |
| 7,122,246 B2 | 10/2006 | Comb et al. | |
| 7,172,715 B2 | 2/2007 | Swanson et al. | |
| 7,229,586 B2 | 6/2007 | Dunlap et al. | |
| 7,318,720 B2 * | 1/2008 | Pabedinskas | B29C 47/0019 425/378.1 |
| 7,363,686 B2 | 4/2008 | Fukuyasu et al. | |
| 7,384,255 B2 | 6/2008 | LaBossiere et al. | |
| 7,604,470 B2 | 10/2009 | LaBossiere et al. | |
| 7,625,200 B2 | 12/2009 | Leavitt | |
| 7,789,649 B2 | 9/2010 | Diekhaus et al. | |
| 8,021,593 B2 | 9/2011 | Murata et al. | |
| 8,038,430 B2 | 10/2011 | Swanson et al. | |
| 8,382,464 B2 * | 2/2013 | Keller | B29C 47/0816 264/46.1 |
| 8,821,147 B2 * | 9/2014 | Hasegawa | B21C 23/085 425/192 R |
| 9,022,771 B2 * | 5/2015 | Swanson | B29C 47/0002 264/176.1 |
| 2002/0130434 A1 * | 9/2002 | Rigali | B29C 47/0016 264/171.13 |
| 2003/0064124 A1 * | 4/2003 | Comb | B29C 67/0085 425/145 |
| 2004/0086591 A1 | 5/2004 | Vollrath et al. | |
| 2005/0129941 A1 | 6/2005 | Comb et al. | |
| 2005/0261722 A1 | 11/2005 | Crocker et al. | |
| 2007/0003656 A1 | 1/2007 | LaBossiere et al. | |
| 2007/0228590 A1 | 10/2007 | LaBossiere et al. | |
| 2008/0182091 A1 * | 7/2008 | Guenanten | B29C 47/0021 428/220 |
| 2008/0254206 A1 * | 10/2008 | Perera | D01D 5/34 427/118 |
| 2009/0035405 A1 | 2/2009 | Leavitt | |
| 2009/0079101 A1 | 3/2009 | Laubersheimer et al. | |
| 2009/0220785 A1 * | 9/2009 | Monro | B29C 47/0028 428/397 |
| 2009/0256277 A1 | 10/2009 | Brown et al. | |
| 2009/0263582 A1 | 10/2009 | Batchelder | |
| 2009/0273122 A1 | 11/2009 | Batchelder et al. | |
| 2009/0274540 A1 | 11/2009 | Batchelder et al. | |
| 2010/0015267 A1 * | 1/2010 | Keller | B29C 47/92 425/113 |
| 2010/0096072 A1 | 4/2010 | Hopkins et al. | |
| 2010/0096485 A1 | 4/2010 | Taatjes et al. | |
| 2010/0096489 A1 | 4/2010 | Taatjes et al. | |
| 2010/0161356 A1 | 6/2010 | Louie et al. | |
| 2010/0288981 A1 | 11/2010 | Marcolongo et al. | |
| 2010/0327479 A1 * | 12/2010 | Zinniel | B29C 47/0014 264/172.14 |
| 2011/0074065 A1 | 3/2011 | Batchelder et al. | |
| 2011/0076496 A1 | 3/2011 | Batchelder et al. | |
| 2011/0165646 A1 * | 7/2011 | Darling | A61L 27/38 435/174 |
| 2012/0070523 A1 | 3/2012 | Swanson et al. | |
| 2013/0241102 A1 * | 9/2013 | Rodgers | B29C 67/0055 264/132 |
| 2014/0120197 A1 * | 5/2014 | Swanson | B29C 47/0002 425/378.1 |
| 2014/0141168 A1 * | 5/2014 | Rodgers | C08L 77/02 427/265 |
| 2014/0225301 A1 * | 8/2014 | Xu | B29C 47/38 264/177.19 |
| 2015/0028523 A1 * | 1/2015 | Jaker | C08G 63/06 264/401 |
| 2015/0097307 A1 * | 4/2015 | Batchelder | B29C 67/0055 264/40.6 |
| 2015/0097308 A1 * | 4/2015 | Batchelder | B29C 67/0055 264/40.6 |

OTHER PUBLICATIONS

U.S. Appl. No. 12/612,329, filed Nov. 4, 2009, entitled "Ribbon Liquefier for Use in Extrusion-Based Digital Manufacturing Systems", pp. 1-38.

U.S. Appl. No. 12/612,333, filed Nov. 4, 2009, entitled "Non-Cylindrical Filaments for Use in Extrusion-Based Digital Manufacturing Systems", pp. 1-43.

(56) References Cited

OTHER PUBLICATIONS

U.S. Appl. No. 12/820,370, filed Jun. 22, 2010, entitled "Consumable Materials Having Customized Characteristics", pp. 1-30.
U.S. Appl. No. 12/841,341, filed Jul. 22, 2010, entitled "Multiple-Zone Liquefier Assembly for Extrusion-Based Additive Manufacturing Systems", pp. 1-21.
U.S. Appl. No. 12/888,098, filed Sep. 22, 2010, entitled "Method for Building Three-Dimensional Models with Extrusion-Based Additive Manufacturing Systes", pp. 1-30.
"Plastruder MK5 Assembly", MakerBot Industries, http://wiki.makerbot.com/plastruder-mk5assebmly, last updated on Dec. 8, 2010, pp. 1-52.
International Search Report and Written Opinion of International Application No. PCT/US2011/052271 dated Feb. 28, 2012, filed Sep. 20, 2011.

\* cited by examiner

FIG. 2A
FIG. 2B
FIG. 2C
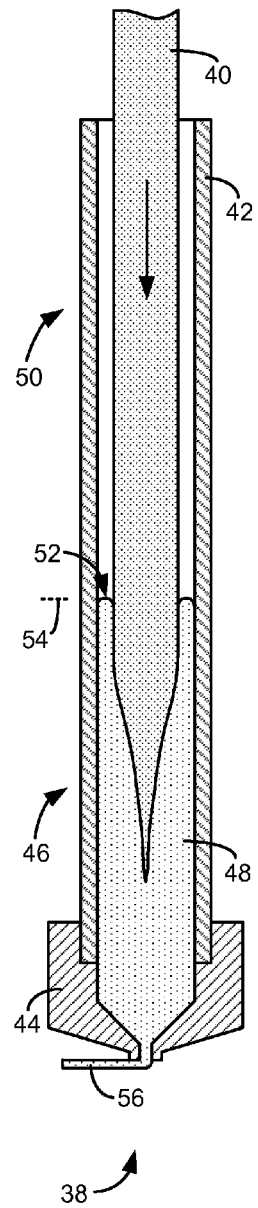
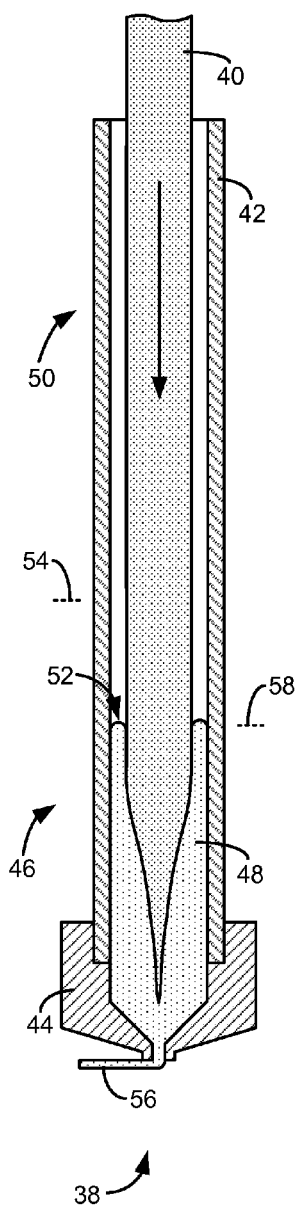
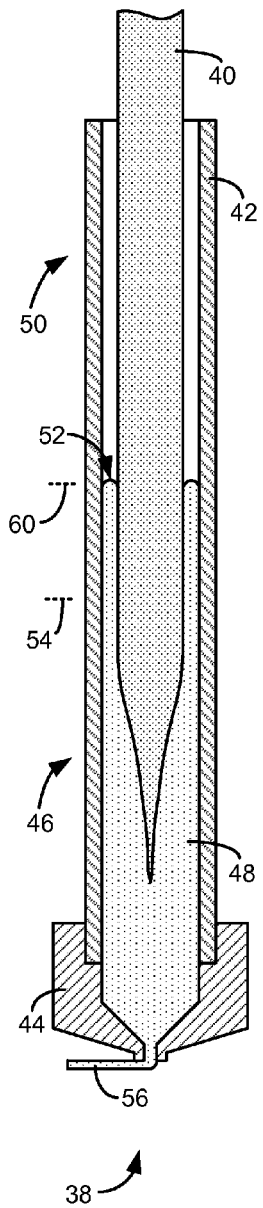

LIQUEFIER ASSEMBLY FOR USE IN EXTRUSION-BASED ADDITIVE MANUFACTURING SYSTEMS

CROSS-REFERENCE TO RELATED APPLICATIONS

This Application is a Continuation Application of U.S. patent application Ser. No. 14/147,065, filed Jan. 3, 2014; which is a continuation application of and claims priority to U.S. patent application Ser. No. 12/888,087, filed on Sep. 22, 2010, now granted U.S. Pat. No. 8,647,098, the contents of which are incorporated by reference.

BACKGROUND

The present disclosure relates to additive manufacturing systems for building three-dimensional (3D) models with layer-based additive manufacturing techniques. In particular, the present disclosure relates to liquefier assemblies for use in extrusion-based additive manufacturing systems.

An extrusion-based additive manufacturing system (e.g., fused deposition modeling systems developed by Stratasys, Inc., Eden Prairie, Minn.) is used to build a 3D model from a digital representation of the 3D model in a layer-by-layer manner by extruding a flowable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D model resembling the digital representation.

Movement of the extrusion head with respect to the substrate is performed under computer control, in accordance with build data that represents the 3D model. The build data is obtained by initially slicing the digital representation of the 3D model into multiple horizontally sliced layers. Then, for each sliced layer, the host computer generates a build path for depositing roads of modeling material to form the 3D model.

In fabricating 3D models by depositing layers of a modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D model being formed. Support material is then deposited from a second nozzle pursuant to the generated geometry during the build process. The support material adheres to the modeling material during fabrication, and is removable from the completed 3D model when the build process is complete.

SUMMARY

A first aspect of the present disclosure is directed to a liquefier assembly for use in an extrusion-based additive manufacturing system. The liquefier assembly includes a downstream portion having a first end and a second end opposite of the first end along a longitudinal length of the liquefier assembly, and a first average inner cross-sectional area. The liquefier assembly also includes an upstream portion disposed adjacent to the first end of the downstream portion, where the upstream portion is configured to receive a consumable material and has a second average inner cross-sectional area that is less than the first inner cross-sectional area. The upstream portion also defines a shoulder between the first inner cross-sectional area and the second inner cross-sectional area, where the shoulder is configured to restrict movement of a melt meniscus of the consumable material. The liquefier assembly further includes an extrusion tip disposed at the second end of the downstream portion.

Another aspect of the present disclosure is directed to a liquefier assembly for use in an extrusion-based additive manufacturing system, where the liquefier assembly includes a liquefier tube, a hollow liner, and an extrusion tip. The liquefier tube has an inlet end, an outlet end, and an inner surface, where the inner surface of the liquefier tube defines a first average inner cross-sectional area. The hollow liner is disposed at least partially within the liquefier tube such that an outlet end of the hollow liner is disposed within the liquefier tube. The hollow liner has an inner surface that defines a second average inner cross-sectional area, where the first average inner cross-sectional area is greater than the second average inner cross-sectional area. The extrusion tip disposed at the outlet end of the liquefier tube at an offset location from the outlet end of the hollow liner.

Another aspect of the present disclosure is directed to a liquefier assembly for use in an extrusion-based additive manufacturing system, where the liquefier assembly includes a downstream portion and an upstream portion. The downstream portion compositionally includes a thermally-conductive material, and has an inner surface with a first average inner cross-sectional area. The upstream portion is disposed adjacent to the downstream portion, and has an low-stick inner surface and a second average inner cross-sectional area that is less than the first average inner cross-sectional area. The liquefier assembly also includes an extrusion tip disposed at an opposing end of the downstream portion from the upstream portion.

BRIEF DESCRIPTION OF THE DRAWINGS

FIG. 2A is a side sectional view of a non-stepped liquefier assembly in use with a filament.

FIG. 2B is a side sectional view of the non-stepped liquefier assembly in use with the filament, which illustrates a meniscus dry down effect due to an increased filament feed rate.

FIG. 2C is a side sectional view of the non-stepped liquefier assembly in use with the filament, which illustrates a raised meniscus due to latent heating and thermal expansion.

DETAILED DESCRIPTION

The present disclosure is directed to a stepped liquefier assembly for use in extrusion-based additive manufacturing systems. The stepped liquefier assembly includes an upstream portion and a downstream portion, where the upstream portion has a smaller inner cross-sectional area than the downstream portion. As discussed below, this stepped cross-sectional areas restricts movement of a meniscus of a molten filament material to a desired height within the stepped liquefier assembly, thereby improving control of the flow rate through the stepped liquefier assembly. The improved flow rate control is desirable for building 3D models and support structures having good part resolution and reduced build times.

Figure 1:
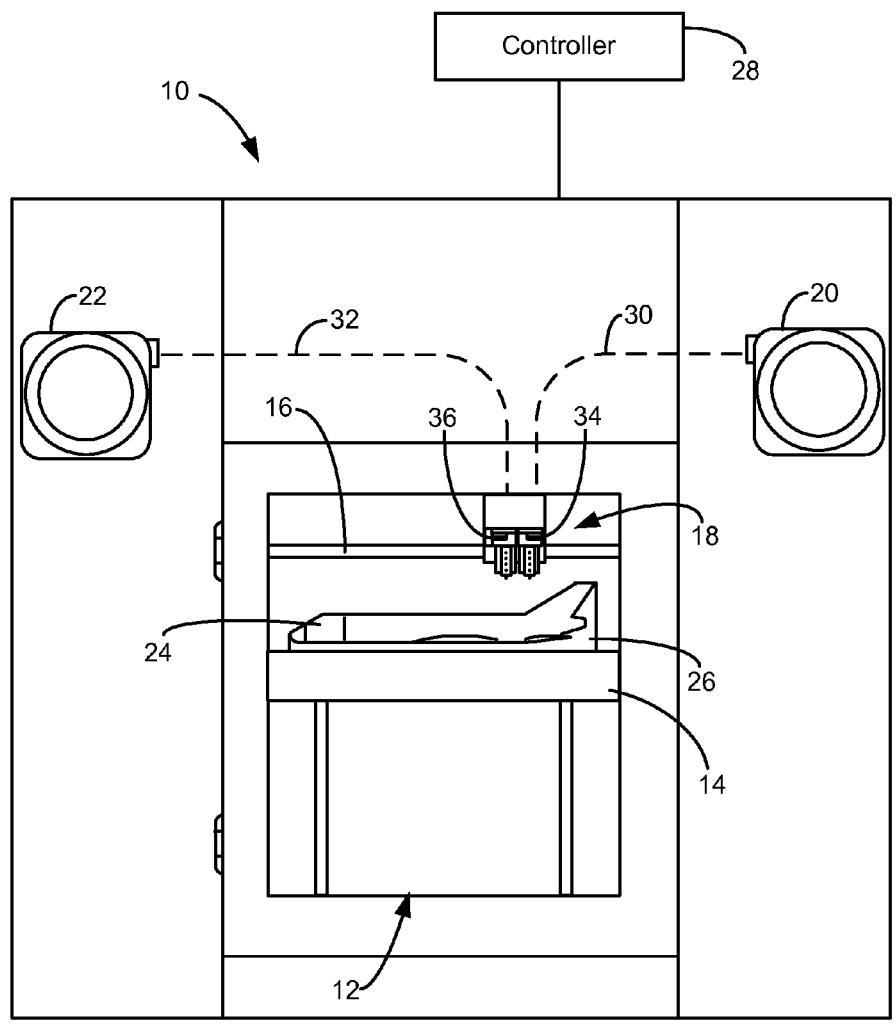
FIG. 1 is a front view of an extrusion-based additive manufacturing system that includes a stepped liquefier assembly of the present disclosure.

As shown in FIG. 1, system 10 is an exemplary extrusion-based additive manufacturing system for building 3D models, and includes build chamber 12, platen 14, gantry 16, extrusion head 18, and supply sources 20 and 22. Examples of suitable systems for system 10 include extrusion-based additive manufacturing systems, such as fused deposition modeling systems developed by Stratasys, Inc., Eden Prairie, Minn. As discussed below, extrusion head 18 may include one or more stepped liquefier assemblies of the present disclosure (not shown in FIG. 1) for melting successive portions of filaments (not shown in FIG. 1) during a build operation with system 10.

Build chamber 12 contains platen 14, gantry 16, and extrusion head 18 for building a 3D model (referred to as 3D model 24) and optionally a corresponding support structure (referred to as support structure 26). Platen 14 is a platform on which 3D model 24 and support structure 26 are built, and desirably moves along a vertical z-axis based on signals provided from computer-operated controller 28. Gantry 16 is a guide rail system that is desirably configured to move extrusion head 18 in a horizontal x-y plane within build chamber 12 based on signals provided from controller 28. The horizontal x-y plane is a plane defined by an x-axis and a y-axis (not shown in FIG. 1), where the x-axis, the y-axis, and the z-axis are orthogonal to each other. In an alternative embodiment, platen 14 may be configured to move in the horizontal x-y plane within build chamber 12, and extrusion head 18 may be configured to move along the z-axis. Other similar arrangements may also be used such that one or both of platen 14 and extrusion head 18 are moveable relative to each other.

Extrusion head 18 is supported by gantry 16 for building 3D model 24 and support structure 26 on platen 14 in a layer-by-layer manner, based on signals provided from controller 28. In the embodiment shown in FIG. 1, extrusion head 18 is a dual-tip extrusion head configured to deposit modeling and support materials from supply source 20 and supply source 22, respectively. Examples of suitable extrusion heads for extrusion head 18 include those disclosed in Crump et al., U.S. Pat. No. 5,503,785; Swanson et al., U.S. Pat. No. 6,004,124; LaBossiere, et al., U.S. Pat. No. 7,604,470; and Leavitt, U.S. Pat. No. 7,625,200. Furthermore, system 10 may include a plurality of extrusion heads 18 for depositing modeling and/or support materials from one or more tips.

The modeling material is supplied to extrusion head 18 from supply source 20 via feed line 30, thereby allowing extrusion head 18 to deposit the modeling material to build 3D model 24. Correspondingly, the support material is supplied to extrusion head 18 from supply source 22 via feed line 32, thereby allowing extrusion head 18 to deposit the support material to build support structure 26. During a build operation, gantry 16 moves extrusion head 18 around in the horizontal x-y plane within build chamber 12, and one or more drive mechanisms, such as drive mechanisms 34 and 36, are directed to intermittently feed the modeling and support materials through extrusion head 18 from supply sources 20 and 22. Examples of suitable drive mechanisms for drive mechanisms 34 and 36 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; and Batchelder et al., U.S. Patent Application Publication No. 2009/0274540.

The received modeling and support materials are then deposited onto platen 14 to build 3D model 24 and support structure 26 using a layer-based additive manufacturing technique. Support structure 22 is desirably deposited to provide vertical support along the z-axis for overhanging regions of the layers of 3D model 24, allowing 3D model 24 to be built with a variety of geometries. After the build operation is complete, the resulting 3D model 24/support structure 26 may be removed from build chamber 12. Support structure 26 may then be removed from 3D model 24.

The consumable materials may be provided to system 10 in an extrusion-based additive manufacturing system in a variety of different media. Commonly, the material is supplied in the form of a continuous filament. For example, in system 10, the modeling and support materials may be provided as continuous filament strands fed respectively from supply sources 20 and 22, as disclosed in Swanson et al., U.S. Pat. No. 6,923,634; Comb et al., U.S. Pat. No. 7,122,246; and Taatjes et al, U.S. Patent Application Publication Nos. 2010/0096485 and 2010/0096489. Examples of suitable average diameters for the filament strands of the modeling and support materials range from about 1.27 millimeters (about 0.050 inches) to about 3.0 millimeters (about 0.120 inches). The terms "about" and "substantially" are used herein with respect to measurable values and ranges due to expected variations known to those skilled in the art (e.g., limitations and variabilities in measurements). Additionally, the terms "three-dimensional model" and "3D model" refer to objects, parts, and the like built using layer-based additive manufacturing techniques, and are not intended to be limited to any particular use.

FIGS. 2A-2C illustrate liquefier assembly 38 in use with filament 40. As shown in FIG. 2A, liquefier assembly 38 includes cylindrical liquefier tube 42 and extrusion tip 44, and is shown melting and extruding the material of filament 40. Liquefier assembly 38 does not include a stepped cross-sectional area, but is otherwise suitable for use in an extrusion-based additive manufacturing system for building high-quality 3D models and support structures. In the shown example of FIGS. 2A-2C, filament 40 may be driven downward with a filament drive mechanism of the extrusion-based additive manufacturing system (e.g., drive mechanism 34, shown in FIG. 1).

Filament 40 is heated to be flowable in liquefier assembly 38, while at the same time a portion of filament 40 entering liquefier assembly 38 remains solid. The strand of filament 40 acts like a piston, and resulting pressurization impels molten material out of extrusion tip 44. The flow rate of material extruded from extrusion tip 44 is controlled by the rate at which filament 40 enters liquefier assembly 38. The material is deposited from extrusion tip 44 in "roads" according to tool paths generated from design data, and the deposited material solidifies to form the model. Any deviations between the deposited roads and a desired extrusion profile may impair the model quality. To build a 3D model which accurately matches the design data, it is thus desirable to accurately predict the flow rate of extruded material.

FIGS. 2A-2C illustrate the counteracting mechanisms that may occur within liquefier assemblies, such as meniscus dry down effects, latent heating and material expansion, and filament diameter variations, each of which may alter the extrusion rates and flow controls of the liquefier assemblies, potentially resulting in inferior model quality.

Liquefier assembly 38 includes a heated lower longitudinal region, referred to as zone 46. Liquefier tube 42 at zone 46 correspondingly heats and melts the material of filament 40 to form melt 48. The region above zone 46, referred to as zone 50, is not directly heated such that a thermal gradient is formed along the longitudinal length of liquefier tube 42.

The molten portion of the filament material (i.e., melt 48) forms meniscus 52 around the unmelted portion of filament 40. While operating at steady state, liquefier assembly 38 has its maximum flow rate dictated by its heated length and the thermal diffusivity of the filament material being extruded. As shown in FIG. 2A, during a steady-steady extrusion of the material through extrusion tip 44, the height of meniscus 52 is maintained at nominal height 54 along the longitudinal length of liquefier tube 42. The downward movement of filament 40 functions as a viscosity pump to extrude the material in melt 48 out of extrusion tip as extruded road 56. The hydraulic pressure required to extrude the material out of extrusion tip 44 is generated by shearing the flow of the molten material within a few millimeters of meniscus 52 using the viscosity pump action.

As shown in FIG. 2B, when the feed rate of filament 40 is increased, the height of meniscus 52 drops toward extrusion tip 44, such as to height 58. At first glance, this drop in height of meniscus 52, referred to herein as "dry down", appears to be counterintuitive. However, the dry down of meniscus 52 from nominal height 54 (shown in FIG. 2A) to height 58 occurs primarily due to two complimentary mechanisms. First, the pressure generated by a constant length of the viscosity pump action below meniscus 52 increases linearly with the shear rate. Second, the longitudinal length of the viscosity pump action below meniscus 52 increases with the feed rate of filament 40 because the time required to melt filament 40 in an inward axial direction from its outer surface is constant.

Therefore, the height of meniscus 52 is an unstable equilibrium, where two mechanisms counteract the vertical motion of meniscus 52. First, as meniscus 52 moves downward towards extrusion tip 44 and the flow rate increases, the average viscosity of melt 48 flowing through extrusion tip 44 increases, thereby requiring extra pressure to maintain the flow. Additionally, when the flow of the extruded material used to form road 56 is greater than an amount that will fit between extrusion tip 44 and the 3D model or the support structure, the extruded material generates an upward backpressure.

Even small changes in the height of meniscus 52 can have substantial effects on the quality of the 3D model or support structure being built. As an example, for liquefier assembly 38 having cylindrical liquefier tube 42 with an inner diameter of 1.88 millimeters (0.074 inches) and with filament 40 having an average diameter of 1.78 millimeters (0.070 inches) (i.e., the gap is about 0.102 millimeters (about 0.004 inches)), a change in height of meniscus 52 of one inch may produce extruded road 56 having a length of about 250 millimeters (about 10 inches), a height of about 0.127 millimeters (about 0.005 inches), and a width of about 0.254 millimeters (about 0.010 inches), with no change in the position of filament 40.

Additionally, as shown in FIG. 2C, in the event that liquefier assembly 38, while operating at a steady-state extrusion rate at a modest speed, is suddenly directed to stop extruding, latent heat may continue to melt the filament material within liquefier tube 42. This molten material expands, thereby pushing meniscus 52 upward into zone 50 of liquefier tube 42, such as to height 60. The cooler temperature of zone 50 may then solidify the molten material within zone 50, thereby effectively plugging up liquefier assembly 38.

Furthermore, liquefier assembly 38 maybe susceptible to variations in the diameter of filament 40 over the length of filament 40. As the diameter of filament 40 increases, the viscosity pump action below meniscus 52 becomes more efficient due to the decrease in gap 56 between the outer surface of filament 40 and the inner surface of liquefier tube 42. As a result, the viscosity pump action pushes meniscus 52 downward. Alternatively, as the diameter of filament 40 decreases, the viscosity pump action below meniscus 52 becomes less efficient, resulting in meniscus 52 rising upward.

As shown in FIGS. 2A-2C, the extrusion properties of liquefier assembly 38 require a balance of counteracting mechanisms, such as meniscus dry down effects, latent heating and material expansion, and filament diameter variations. These counteracting mechanisms may balance out during steady-state operation at a particular feed rate of filament 40. However, when the feed rate of filament 40 increases or decreases, or if the diameter of filament 40 fluctuates, the height of meniscus 52 may vary. This may alter the extrusion rate and response time of liquefier assembly 38. Thus, as discussed below, restricting movement of the meniscus of the molten filament material is desirable to improve control over extrusion rates and response times, thereby improving part quality and build times.

Figure 3:
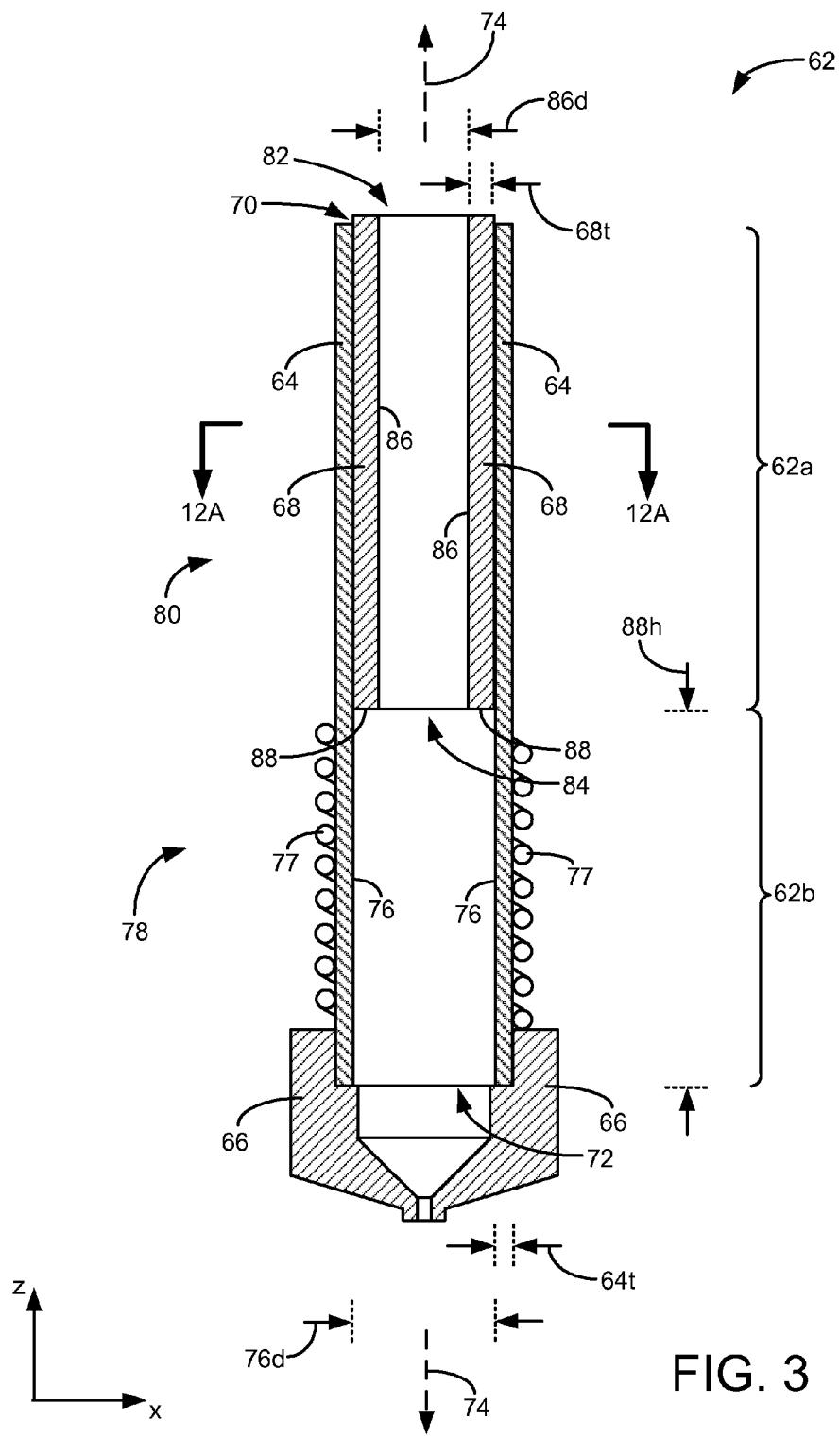
FIG. 3 is a side sectional view of a stepped liquefier assembly of the present disclosure, which includes a hollow liner.
Figure 4:
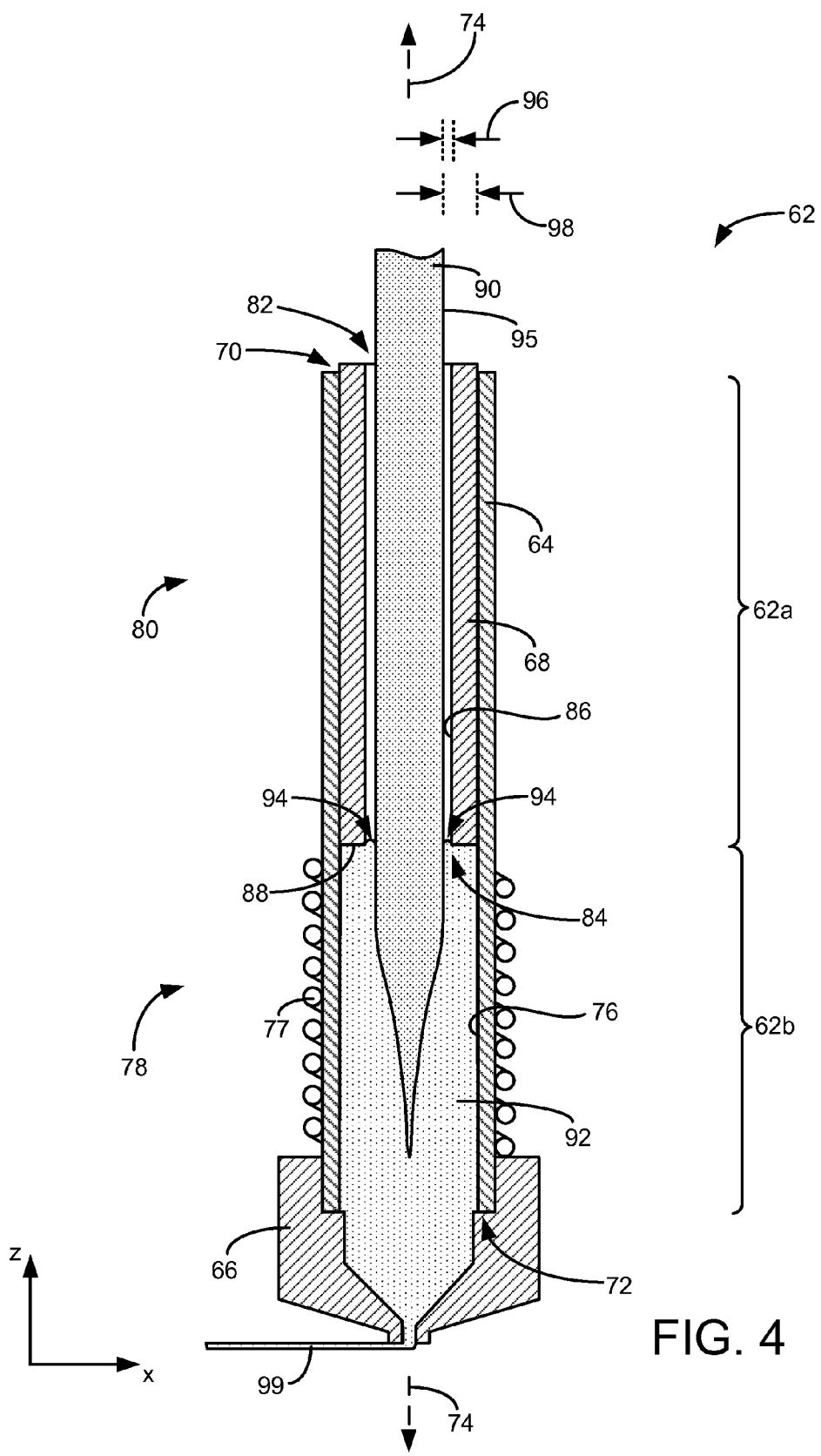
FIG. 4 is a side sectional view of the stepped liquefier assembly of the present disclosure in use with a filament.

FIGS. 3 and 4 illustrate liquefier assembly 62, which is an example of a stepped liquefier assembly of the present disclosure, and is a suitable liquefier assembly for use in system 10 (shown in FIG. 1). As discussed below, liquefier assembly 62 is capable of restricting movement of a meniscus at a desired height. In particular, liquefier assembly 62 achieves a combination of reducing meniscus dry down effects, blocking molten material from flowing upward due to thermal expansion, and compensating for filament diameter variations. This improves control of extrusion rates and response times for building 3D models and support structures (e.g., 3D model 24 and support structure 26).

As shown in FIG. 3, liquefier assembly 62 includes liquefier tube 64, extrusion tip 66, and hollow liner 68, where the location of hollow liner 68 divides liquefier assembly 62 into upstream portion 62a and downstream portion 62b. As used herein, the terms "upstream" and "downstream" refer to locations relative to a direction of movement of a material through the liquefier assembly (e.g., in a downward direction in the view shown in FIG. 3). As discussed below, upstream portion 62a has a smaller inner diameter than downstream portion 62b, thereby providing a stepped cross-sectional area.

Liquefier tube 64 includes inlet end 70 and outlet end 72, which are offset along longitudinal axis 74. Liquefier tube 64 also includes inner surface 76, which, in the shown embodiment in which liquefier tube 64 and hollow liner 68 are cylindrical, is an inner diameter surface of liquefier tube 64 and downstream portion 62b. While liquefier assembly 62 and hollow liner 68 are discussed herein as having cylindrical geometries, liquefier assemblies of the present disclosure may alternatively include non-cylindrical geometries. Accordingly, as used herein unless otherwise indicated, the terms "tube" and "hollow liner" include a variety of hollow geometries, such as cylindrical geometries, elliptical geometries, polygonal geometries (e.g., rectangular and square geometries), axially-tapered geometries, and the like.

Liquefier tube 64 functions as a thin-wall liquefier for transferring heat from one or more external heat transfer components, such as heating coil 77, to a filament (not shown in FIG. 3) retained within liquefier tube 64. Heating coil 77 desirably extends around a lower portion of liquefier tube 64 and/or extrusion tip 66 to define zone 78 for heating and melting the filament. In particular, heating coil 77 heats liquefier tube 64 at zone 78, and liquefier tube 64 correspondingly conducts the heat to melt the modeling or support material of the filament within zone 78. The region above zone 78, referred to as zone 80, is desirably not directly heated by heating coil 77 such that a thermal gradient is formed along longitudinal length 74 of liquefier tube 64.

Heating coil 77 is one or more thermally-conductive coils or wires (e.g., nickel-chromium wire) wrapped around a portion of liquefier tube 64 and/or extrusion tip 66. Liquefier assembly 62 may also include one or more thermal-spreading sheaths (e.g. aluminum sleeves) (not shown) between liquefier tube 64 and heating coils 77, and one or more insulation sleeves (not shown) wrapped around heating coils 77. In one embodiment, the heating coil 77 may include a multiple-zone arrangement as disclosed in Swanson et al., U.S. patent application Ser. No. 12/841,341, entitled "Mul-tiple-Zone Liquefier Assembly for Extrusion-Based Additive Manufacturing Systems". Examples of suitable alternative heat transfer components for use with liquefier assembly 62 include those disclosed in Swanson et al., U.S. Pat. No. 6,004,124; Comb, U.S. Pat. No. 6,547,995; LaBossiere et al., U.S. Publication No. 2007/0228590; and Batchelder et al., U.S. Patent Application Publication No. 2009/0273122.

Liquefier tube 64 is fabricated from one or more thermally-conductive materials to transfer thermal energy from the external heat transfer component(s) to the filament. Suitable materials for liquefier tube 64 include materials having average thermal conductivities greater than about 10 watts/meter-Kelvin (W/m-K), where thermal conductivities referred to herein are measured pursuant to ASTM E1225-09. Additionally, the material for liquefier tube 64 is desirably capable of withstanding the thermal environment of build chamber 12 (shown in FIG. 1) and liquefier assembly 62 without melting or thermal degradation for a suitable operational life. Examples of suitable materials for liquefier tube 64 include metallic materials (e.g., stainless steel), graphite, and the like.

In the shown embodiment, liquefier tube 64 has a substantially uniform wall thickness, referred to as wall thickness 64t. Examples of suitable average thicknesses for wall thickness 64t range from about 0.1 millimeters (about 0.004 inches) to about 0.3 millimeters (about 0.12 inches), with particularly suitable thicknesses ranging from about 0.15 millimeters (about 0.006 inches) to about 0.22 millimeters (about 0.009 inches). Suitable lengths for liquefier tube 64 along longitudinal axis 74 may vary depending on desired processing conditions, such that the length of liquefier tube 64 is sufficient for retaining hollow liner 68 and for providing zone 78.

In the shown embodiment, liquefier tube 64 also has a substantially uniform inner diameter at inner surface 76, referred to as inner diameter 76d, which is also the inner diameter of downstream portion 62b. Examples of suitable average dimensions for inner diameter 76d range from about 1.40 millimeters (about 0.055 inches) to about 3.18 millimeters (about 0.125 inches), where the average dimensions may be designed in combination with the dimensions of an intended filament diameter. Accordingly, in some embodiments, examples of suitable dimensions for inner diameter 76d range from about 105% to about 150% of the average diameter of the intended filament, with particularly suitable dimensions ranging from about 110% to about 125% of the average diameter of the intended filament.

The use of hollow liner 68 allows inner diameter 76d of liquefier tube 64 to be greater than a corresponding inner diameter of liquefier tube 38 (shown in FIGS. 2A-2C), while still maintaining a good viscosity pump action. In other words, as discussed below, the gap between inner surface 76 of liquefier tube 64 and an average diameter of a filament used with liquefier assembly 62 is desirably greater than the gap between an inner surface of liquefier tube 38 and the average diameter of filament 40 (shown in FIGS. 2A-2C).

Extrusion tip 66 is a small-diameter tip that is secured to outlet end 72 of liquefier tube 64 and is configured to extrude molten material at a desired road width. Examples of suitable inner tip diameters for extrusion tip 66 range from about 125 micrometers (about 0.005 inches) to about 510 micrometers (about 0.020 inches). Extrusion tip 66 may be fabricated from one or more materials configured to withstand the thermal environment of build chamber 12 (shown in FIG. 1) and liquefier assembly 62 without melting or thermal degradation for a suitable operational life, such as one or more metallic materials (e.g., stainless steel). Extrusion tip 66 may be secured to liquefier tube 64 at outlet end 72 in a variety of manners, such as snap-based, fastener-based, or screw-based mechanical interlocking, welding, and the like.

Hollow liner 68 is located at least partially within liquefier tube 64, and desirably extends around inner surface 76 above zone 78. Hollow liner 68 includes inlet end 82 and outlet end 84, which are offset along longitudinal axis 74. Hollow liner 68 also include inner surface 86 extending between inlet end 82 and outlet end 84, which is also the inner surface of upstream portion 62a. In the shown embodiment, inlet end 82 is adjacent to inlet end 70 of liquefier tube 64. In alternative embodiments, inlet end 82 may extend further above inlet end 70 along longitudinal axis 76.

As discussed above, the location of hollow liner 68 within liquefier tube 64, particularly the location of outlet end 84, divides liquefier assembly 62 into upstream portion 62a and downstream portion 62b. Outlet end 84 of hollow liner 68 is located within liquefier tube 64, between inlet end 70 and outlet end 72, such that extrusion tip 66 is disposed at an offset location from outlet end 84 along longitudinal length 74. Outlet end 84 is desirably positioned along liquefier tube 64 at a location at which a desired meniscus of the molten material will be located, which may vary depending on the operating parameters of liquefier assembly 62, such as the dimensions of liquefier assembly 62, the material and geometry of the intended filament, the thermal gradient along liquefier tube 64, and the like. In the embodiment shown in FIG. 3, outlet end 84 is located above zone 78.

Hollow liner 68 may be fabricated from a variety of different materials that are capable of withstanding the thermal environment of build chamber 12 (shown in FIG. 1) and liquefier assembly 62 without melting or thermal degradation for a suitable operational life. Suitable materials for hollow liner 68 include fluorinated polymers (e.g., perfluoropolymers), diamond-like carbon materials, graphite, ceramic alloys, metallic materials (e.g., stainless steel), and combinations thereof.

In some embodiments, inner surface 86 of hollow liner 68 and upstream portion 62a has a low surface energy. For example, hollow liner 68 may be fabricated from one or more materials having low coefficients of friction, such as fluorinated polymers (e.g., perfluoropolymers), diamond-like carbon materials, ceramic alloys, and combinations thereof. In this embodiment, suitable materials for hollow liner 68 include materials having static coefficients of friction less than about 0.3, with particularly suitable materials having static coefficients of friction less than about 0.2, and with even more particularly suitable materials having static coefficients of friction less than about 0.1, where static coefficient of frictions referred to herein are measured pursuant to ASTM D1894-08.

Examples of suitable fluorinated polymers include polytetrafluoroethylenes (PTFE), fluorinated ethylene propylenes, and perfluoroalkoxy polymers. Examples of suitable commercially available fluorinated polymers include PTFE available under the trade designation "TEFLON" from E.I. du Pont de Nemours and Company, Wilmington, Del. Examples of suitable ceramic alloys include those based on aluminum-magnesium-boride ($AlMgB_{14}$), such as $AlMgB_{14}$ alloys with titanium boride ($TiB_2$).

Additionally or alternatively, the low surface energy may be attained through one or more surface modification techniques (e.g., polishing). Accordingly, suitable surface energies for inner surface 86 include surface energies less than about 75 millinewtons/meter, with particularly suitable surface energies including less than about 50 millinewtons/meter, and with even more particularly suitable surface energies including less than about 25 millinewtons/meter, where the surface free energies referred to herein as measured pursuant to ASTM D7490-08.

As discussed below, a low surface energy allows hollow liner 68 (and upstream portion 62a) to have a small inner diameter, thereby providing a small gap between inner surface 86 and a filament used with liquefier assembly 62. In the shown embodiment, hollow liner 68 has a substantially uniform inner diameter at inner surface 86, referred to as inner diameter 86d, which is also the inner diameter of upstream portion 62a.

Suitable diameters for inner diameter 86d may vary depending on the average diameter of the intended filament. Alternatively, as discussed below, hollow liner 68 may be compliant such that inner diameter 86d may tend to size onto the filament. Examples of suitable average diameters for inner diameter 86d range from about 1.32 millimeters (about 0.052 inches) to about 3.10 millimeters (about 0.122 inches). In some embodiments, examples of suitable average diameters for inner diameter 86d range from about 101% to about 110% of the average diameter of the intended filament, with particularly suitable average diameters ranging from about 102% to about 105% of the average diameter of the intended filament.

In the shown embodiment, hollow liner 68 also has a substantially uniform wall thickness, referred to as wall thickness 68t. Examples of suitable average thicknesses for wall thickness 68t range from about 0.25 millimeters (about 0.01 inches) to about 2.0 millimeters (about 0.08 inches), with particularly suitable thicknesses ranging from about 0.33 millimeters (about 0.13 inches) to about 0.48 millimeters (about 0.02 inches). As shown, wall thickness 68t at outlet end 84 defines shoulder 88, which is a downward-facing annular surface that offsets the distance between inner diameters 76d and 86d, thereby providing the stepped cross-sectional areas.

Suitable lengths for hollow liner 68 along longitudinal axis 74 may also vary depending on the operating parameters, and on the length of liquefier tube 64. The height shoulder 88 along longitudinal axis 74 relative to outlet end 72 of liquefier tube 64 is desirably positioned along liquefier tube 64 at a height at which a desired meniscus of the molten material is to be located. Examples of suitable average distances for shoulder 88 to be located from outlet end 72, referred to as height 88h, range from about 13 millimeters (about 0.5 inches) to about 130 millimeters (about 5.0 inches), with particularly suitable distances ranging from about 25 millimeters (about 1.0 inch) to about 51 millimeters (about 2.0 inches).

Liquefier assembly 62 may be manufactured using conventional techniques. For example, liquefier tube 64 may be cast, extruded, drawn, or otherwise molded to desired dimensions. Hollow liner 64 may also be cast, extruded, drawn, or otherwise molded to desired dimensions, and then inserted within liquefier tube 64. Hollow liner 68 may be fixedly secured within liquefier tube 64, or may be loosely retained within liquefier tube 64, depending on the particular arrangements of hollow liner 68. For example, hollow liner 68 may be retained within liquefier tube 64 with a mild frictional fit, while a top end of hollow liner 68 (at inlet end 82) may be folded over, outside of liquefier tube 64 to prevent hollow liner 68 from sliding downward into liquefier tube 64. Extrusion tip 66 may also be secured to liquefier tube 64 and outlet end 72, as discussed above, or otherwise disposed at outlet end 72.

FIG. 4 shows liquefier assembly 62 in use with filament 90, where reference labels for wall thicknesses 64t and 68t, for inner diameters 76*d* and 86*d*, and for height 88*h* are omitted for ease of viewing and discussion. As shown in FIG. 4, during a build operation with filament 90, successive solid segments of filament 90 are fed into inlet end 82 of hollow liner 68, passed through the lumen region of hollow liner 68, and out of outlet end 84 into zone 78 of liquefier tube 64. The successive solid segments are then melted in zone 78 to provide molten material, referred to as melt 92. Melt 92 forms or otherwise defines meniscus 94 around the unmelted portion of filament 90, where the upward movement of meniscus 94 is substantially blocked by shoulder 88 of hollow liner 68.

Filament 90 includes outer surface 95. As shown, the gap between inner surface 86 of hollow liner 68/upstream portion 62*a* and outer surface 95 of filament 90, referred to as gap 96, is small compared to the gap between inner surface 76 of liquefier tube 64/downstream portion 62*b* and outer surface 95, referred to as gap 98. Gap 96 is measured as half of the difference between the average diameter of inner diameter 86*d* (shown in FIG. 3) and the average diameter of filament 90 in a solid state, along longitudinal length 74. Similarly, gap 98 is determined as half of the difference between the average diameter of inner diameter 76*d* (shown in FIG. 3) and the average diameter of filament 90 in a solid state, along longitudinal length 74.

Accordingly, upstream portion 62*a*, as defined by hollow liner 64, allows the combination of a narrow upper gap 96 and a larger lower gap 98 to be attained in a single liquefier. The larger dimensions for gap 98 allow a larger volume of melt 102 to exist in zone 78, which may increase the heat transfer rate within zone 78 and may reduce meniscus dry down effects. The smaller dimensions for gap 96 provide a relatively tight fit between hollow liner 68 and filament 90, thereby preventing meniscus 94 from rising within liquefier tube 64. This is in addition to shoulder 88, which itself physically blocks meniscus 94 from rising. Furthermore, in some embodiments, the low surface energy of inner surface 86 may also prevent the molten material of meniscus 94 from sticking to inner surface 86 when solidifying within zone 80.

During a steady-state extrusion of the material through extrusion tip 66, the height of meniscus 94 is maintained at the height of shoulder 88 along longitudinal length 74. The downward movement of filament 90 functions as a viscosity pump to extrude the material in melt 92 out of extrusion tip as extruded road 99. The hydraulic pressure required to extrude the material out of extrusion tip 66 is generated by shearing the flow of the molten material within a few millimeters of meniscus 94 using the viscosity pump action.

When the feed rate of filament 90 is increased, meniscus 94 does not exhibit a substantial dry down effect. In other words, the height of meniscus 94 is substantially maintained at or adjacent to shoulder 88. This is in comparison to meniscus 52 of liquefier assembly 38 shown in FIG. 2B, which may exhibit a significant dry down effect when the feed rate of filament 40 is increased.

While not wishing to be bound by theory, it is believed that the reduction in the meniscus dry down may be due to a combination of dissimilar thermal conductivities between liquefier tube 64 and hollow liner 68, and the large dimensions of gap 98 compared to gap 96. The combination of the dissimilar thermal conductivities between liquefier tube 64 and hollow liner 68 provides a defined and abrupt thermal gradient at shoulder 88. This thermal gradient is believed to assist in reducing the dry down of meniscus 94 when the feed rate of filament 90 is increased.

Additionally, the larger dimensions for gap 98 reduce the pressure generated by the viscosity pump action within zone 78. This also reduces the dry down of meniscus 94 when the feed rate of filament 90 is increased. As such, even when the feed rate of filament 90 is increased, the effective heated length of liquefier assembly 62 is substantially maintained at shoulder 88. This constant heated length allows liquefier assembly 62 to achieve higher flow rates than the peak flow rate attainable with a liquefier assembly 38 having the same dimensions.

In the event that liquefier assembly 62, while operating at a steady-state extrusion rate at a modest speed, is suddenly directed to stop extruding (corresponding to liquefier assembly 38 shown above in FIG. 2C), latent heat may exist to melt filament 90 in zone 78. However, shoulder 88, the small dimensions of gap 96, and the low surface energy of inner surface 86 restrict or prevent meniscus 94 from rising upward into zone 80 of liquefier tube 64. This reduces or prevents molten filament material from reaching zone 80, which may otherwise cool down and effectively plug of liquefier assembly 62, as discussed above for liquefier assembly 38 in FIG. 2C.

In some embodiments, hollow liner 68 may be compliant such that small amounts of the molten filament material of melt 92 may creep up or otherwise flow between liquefier tube 64 and hollow liner 68 at shoulder 88. In these embodiments, hollow liner 68 desirably exhibits a Young's Modulus ranging from about 0.1 gigapascals to about 5.0 gigapascals, with particularly suitable Young's Modulus values ranging from about 0.2 gigapascals to about 3.0 gigapascals, and with even more particularly suitable Young's Modulus values ranging from about 0.3 gigapascals to about 1.0 gigapascal, where Young's Modulus values referred to herein are measured pursuant to ASTM D4065-06. In comparison, suitable Young's Modulus values for liquefier tube 64 include values of at least about 50 gigapascals, with particularly suitable Young's Modulus values including values of at least about 100 gigapascals.

For example, hollow liner 68 derived from a PTFE tubing (Young's Modulus of about 0.5 gigapascals) may exhibit this form of compliance in a stainless-steel liquefier tube 64 (Young's Modulus of about 200 gigapascals). The small of amounts of material tend size inner diameter 86*d* (shown in FIG. 3) onto filament 90, such that inner surface 86 tends to contact various portions of outer surface 95 of filament 90 (i.e., gap 96 is reduced). As such, the thickness of meniscus 94 at gap 96 becomes small enough such that the viscosity pump action effectively becomes fixed. This renders the viscosity pump action in liquefier assembly 62 independent of variations in the diameter of filament 90. As a result, the height of meniscus 94 does not substantially change due to variations in the diameter of filament 90.

As discussed below, in alternative embodiments, liquefier assembly 62 may exhibit a non-cylindrical geometry (e.g., a rectangular geometry). In these embodiments, diameters 76*d* and 86*d* may alternatively be measured and compared based on their respective inner cross-sectional areas. For example, an inner diameter 76*d* of 2.03 millimeters (0.080 inches) provides a hollow cross-sectional area of 3.24 square millimeters (0.005 square inches), and an inner diameter 86*d* of 1.83 millimeters (0.072 inches) provides an inner cross-sectional area of 2.63 square millimeters (0.004 square inches). Thus, in this example, the inner cross-sectional area of inner surface 76 is about 123% of the inner cross-sectional area of inner surface 86.

Accordingly, since inner diameter 76*d* of downstream portion 62*b* is greater than inner diameter 86*d* of upstream portion 62a, the average inner cross-sectional area corresponding to inner diameter 76d is also greater than the average inner cross-sectional area corresponding to inner diameter 86d. Examples of suitable inner cross-sectional areas for inner surface 76 relative to inner surface 86 include cross-sectional areas of at least about 105% of the inner cross-sectional area of inner surface 86, with particularly suitable cross-sectional areas ranging from about 110% to about 150% of the inner cross-sectional area of inner surface 86, and with even more particularly suitable cross-sectional areas ranging from about 115% to about 135% of the inner cross-sectional area of inner surface 86.

The use of a stepped cross-sectional area, such as with hollow liner 68 within liquefier tube 64, restricts movement of meniscus 94 at a desired height within liquefier tube 64. For example, hollow liner 68 may achieve a combination of reducing the dry down of meniscus 94, blocking meniscus 94 from flowing upward due to thermal expansion, and compensating for diameter variations in filament 90. This improves control of extrusion rates and response times for building 3D models and support structures (e.g., 3D model 24 and support structure 26) having good part quality and reduced build times.

Figure 5:
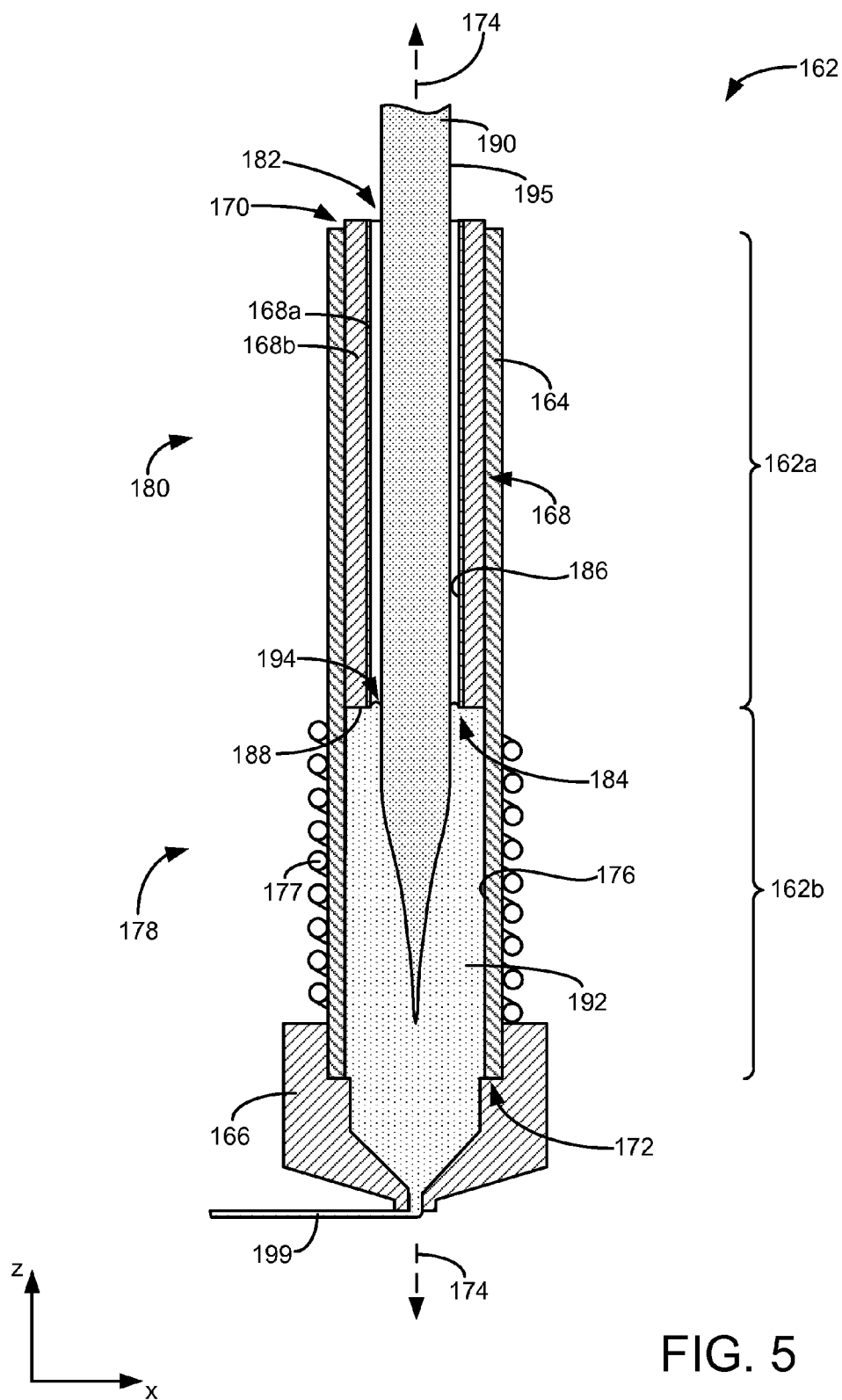
FIG. 5 is a side sectional view of a first alternative stepped liquefier assembly of the present disclosure in use with a filament, which includes a coated hollow liner.

FIGS. 5-11 illustrate alternatives to liquefier assembly 62 (shown in FIGS. 3 and 4) having corresponding upstream and downstream portions, where corresponding reference labels are increased by "100", "200", "300", "400", "500", and "600", respectively. Heating coils corresponding to heating coils 77 (shown in FIGS. 3 and 4) are omitted for ease of discussion. As shown in FIG. 5, liquefier assembly 162 includes hollow liner 168 having inner coating 168a and outer portion 168b, where inner coating 168a is disposed on an inner surface of outer portion 168b. In this embodiment, inner coating 168a may compositionally include one or more materials having low coefficients of friction and/or that provide low surface energies for inner surface 186, and that are capable of withstanding the thermal environment of build chamber 12 (shown in FIG. 1) and liquefier assembly 162 without melting or thermal degradation for a suitable operational life. Examples of suitable materials include those discussed above for hollow liner 68.

Outer portion 168b may compositionally include a different material from inner coating 168a. For example, outer portion 168b may be derived from one or more materials having low thermal conductivities, and that are capable of withstanding the thermal environment of build chamber 12 (shown in FIG. 1) and liquefier assembly 162 without melting or thermal degradation for a suitable operational life. Accordingly, hollow liner 168 may be fabricated with different materials to attain different physical and thermal properties. For example, inner coating 168a may be derived from a first material having a low coefficient of friction, but that does not necessarily have a low thermal conductivity; and outer portion 168b may be derived from a second material having a low thermal conductivity, but that does not necessarily have a low coefficient of friction.

In the shown embodiment, outer portion 168b constitutes the bulk of hollow liner 168, and inner coating 168a constitutes a thin layer applied to the inner surface of outer portion 168b. This is suitable for embodiments in which the thermal properties of outer portion 168b are desired (e.g., low thermal conductivity), and in which the surface properties of inner coating 168a are desired (e.g., low surface energy). In alternative embodiments, hollow liner 168 may include three or more layers, where the thickness of each layer may vary depending on the desired properties to be attained. In yet another embodiment, outer portion 168b may be integrally formed with liquefier tube 164 as a single component, and inner coating 168a may then be applied to the inner surface of outer portion 168b.

Figure 6:
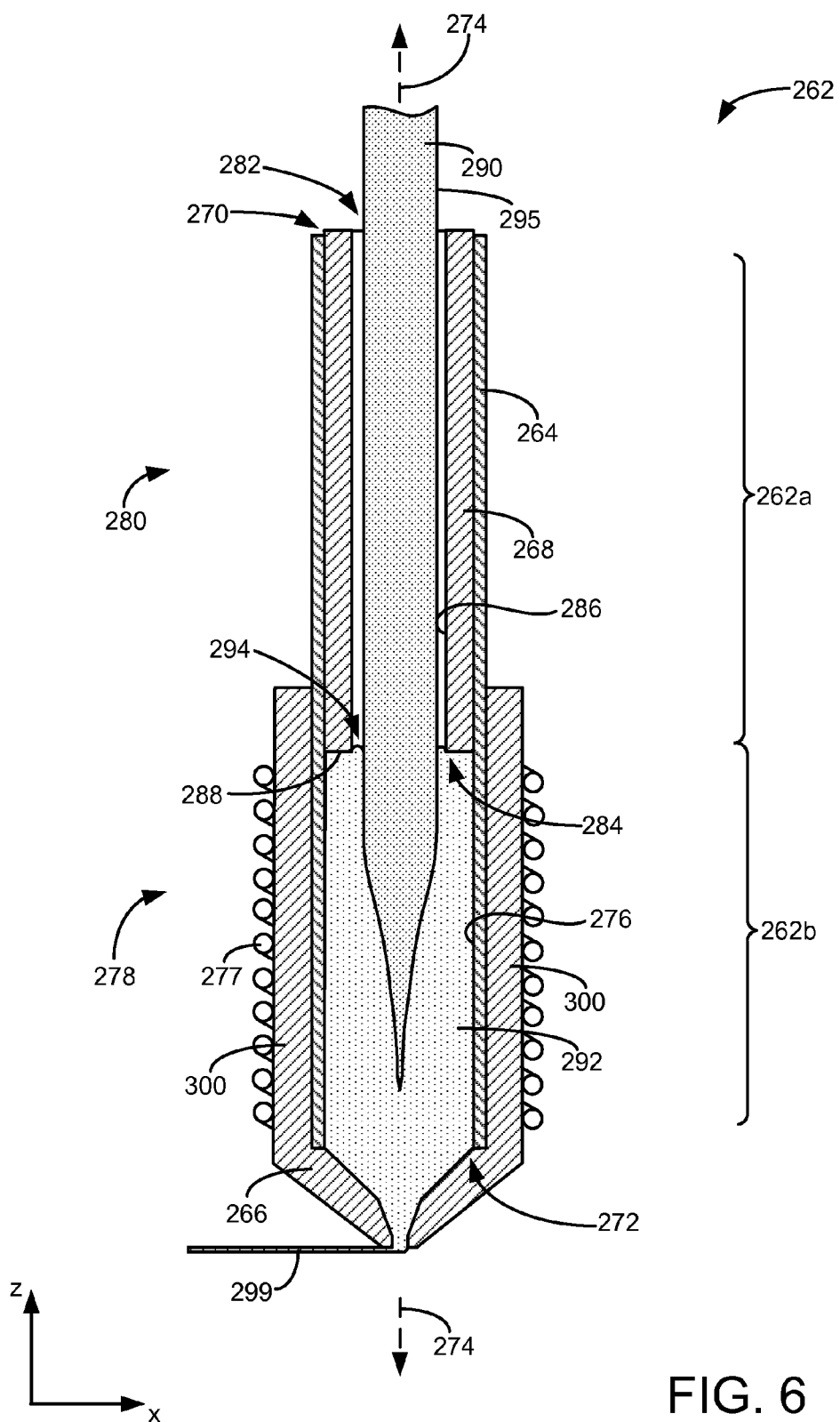
FIG. 6 is a side sectional view of a second alternative stepped liquefier assembly of the present disclosure in use with a filament, which includes a thin liquefier tube wall and a thermal sheath.

As shown in FIG. 6, liquefier assembly 262 includes liquefier tube 264 and extrusion tip 266, where liquefier tube 264 has a wall thickness 264t that is thinner than wall thickness 64t of liquefier tube 64 (shown in FIG. 3). Additionally, liquefier assembly 262 also includes thermal sheath 300, which, in the shown embodiment, is integrally formed with extrusion tip 266 and extends around liquefier tube 264 beyond the extent covered by extrusion tip 66 (shown in FIGS. 3 and 4). This allows extrusion tip 266 to laterally support liquefier tube 264 from the hydraulic pressures exerted by the viscosity pump action, in addition to providing good thermal spreading and heat control.

Thermal sheath 300 extends around liquefier tube 264 beyond the height of outlet end 284 of hollow liner 268. In alternative embodiments, thermal sheath 300 may extend around liquefier tube 264 up to different heights along longitudinal length 274, where the extent desirably reaches a height that is at least as far up along longitudinal length 274 as outlet end 284 of hollow liner 268.

Wall thickness 264t may be less than a thickness that would otherwise be required for an unsupported liquefier tube. Examples of suitable thicknesses for wall thickness 264t range from about 0.05 millimeters (about 0.002 inches) to about 0.25 millimeters (about 0.010 inches), with particularly suitable thicknesses ranging from about 0.076 millimeters (about 0.003 inches) to about 0.15 millimeters (about 0.006 inches). The reduced wall thickness for liquefier tube 264 is beneficial for reducing the thermal conductivity vertically along longitudinal length 274. Additionally, the reduced wall thickness reduces the mass of liquefier tube 264, thereby reducing the time required to heat liquefier tube 264 from an ambient temperature to an operating temperature.

Figure 7:
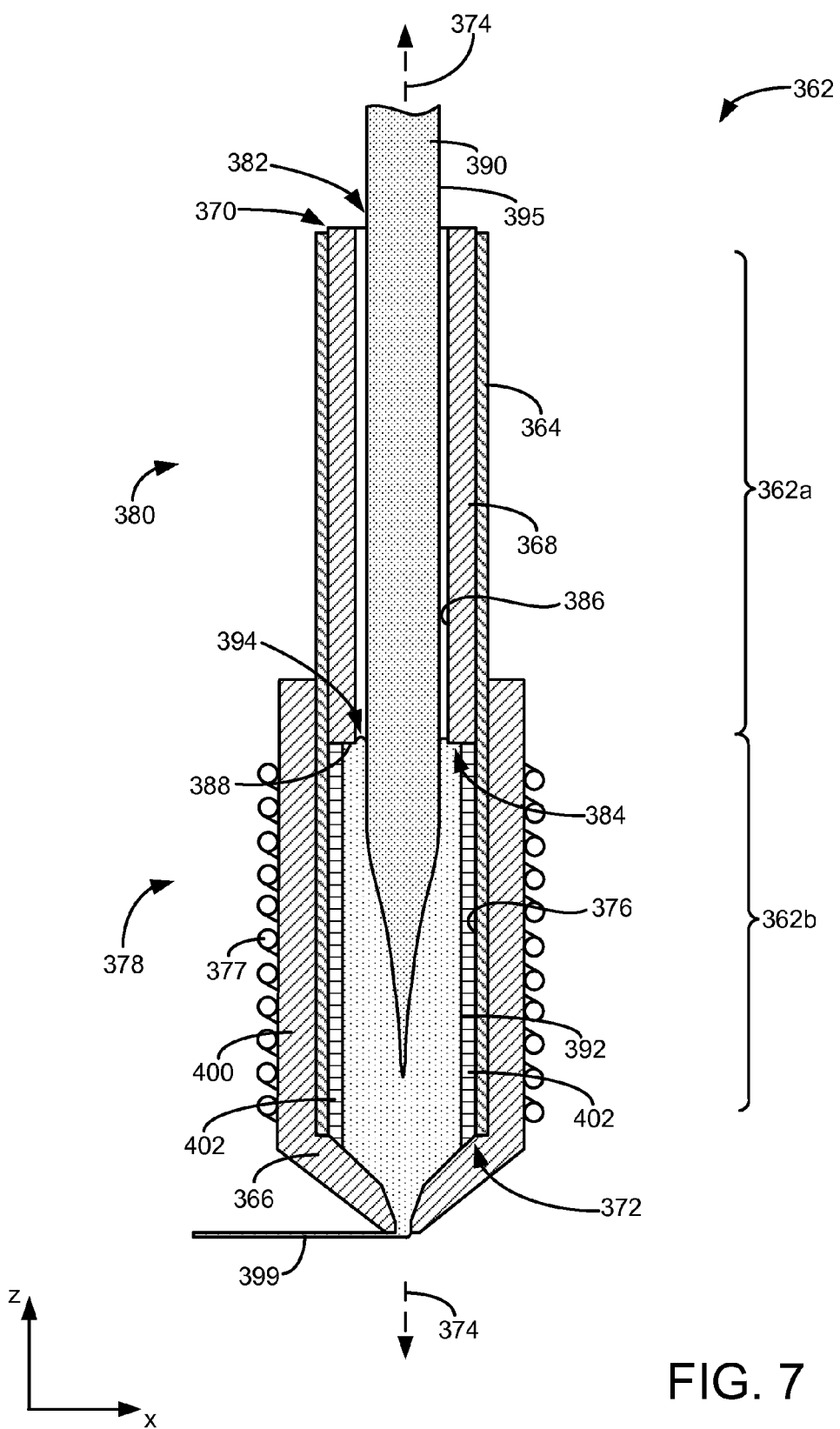
FIG. 7 is a side sectional view of a third alternative stepped liquefier assembly of the present disclosure in use with a filament, which includes a thin liquefier tube wall, a thermal sheath, and a lower tube.

As shown in FIG. 7, liquefier assembly 362 includes liquefier tube 364, extrusion tip 366, and thermal sheath 400, which may function in the same manner as liquefier tube 264, extrusion tip 266, and thermal sheath 300 (shown in FIG. 6). Liquefier assembly 362 also includes lower tube 402, which extends around inner surface 376 of liquefier tube 362 at zone 378. Liquefier assembly 362 (and the other liquefier assemblies of the present disclosure) desirably operates with a thermal profile that reduces the risk of, or eliminates, thermal degradation of the filament materials. However, in some situations, gas may be generated in melt 392, typically from thermal degradation of some filament materials and/or the generation of steam from wet filament materials. This generated gas may collect in the annulus defined by the shoulder of the hollow liner (e.g., shoulder 88 of liquefier assembly 62, shown in FIGS. 3 and 4), which can result in oozing of the extruded material at the ends of the extruded roads (e.g., extruded road 99, shown in FIG. 4).

To reduce or prevent build up of such generated gas, lower tube 402 may be disposed within liquefier tube 364 to reduce the thickness of the annulus defined by shoulder 388. Lower tube 402 is desirably fabricated from one or more materials having high thermal conductivities, such as stainless steel, to assist in the heat transfer to filament 390 within zone 378. As shown, the use of lower tube 402 reduces the thickness of the annulus created by shoulder 388 such that the viscosity pump action can carry any generated gas pockets down through extrusion tip 366.

Figure 8:
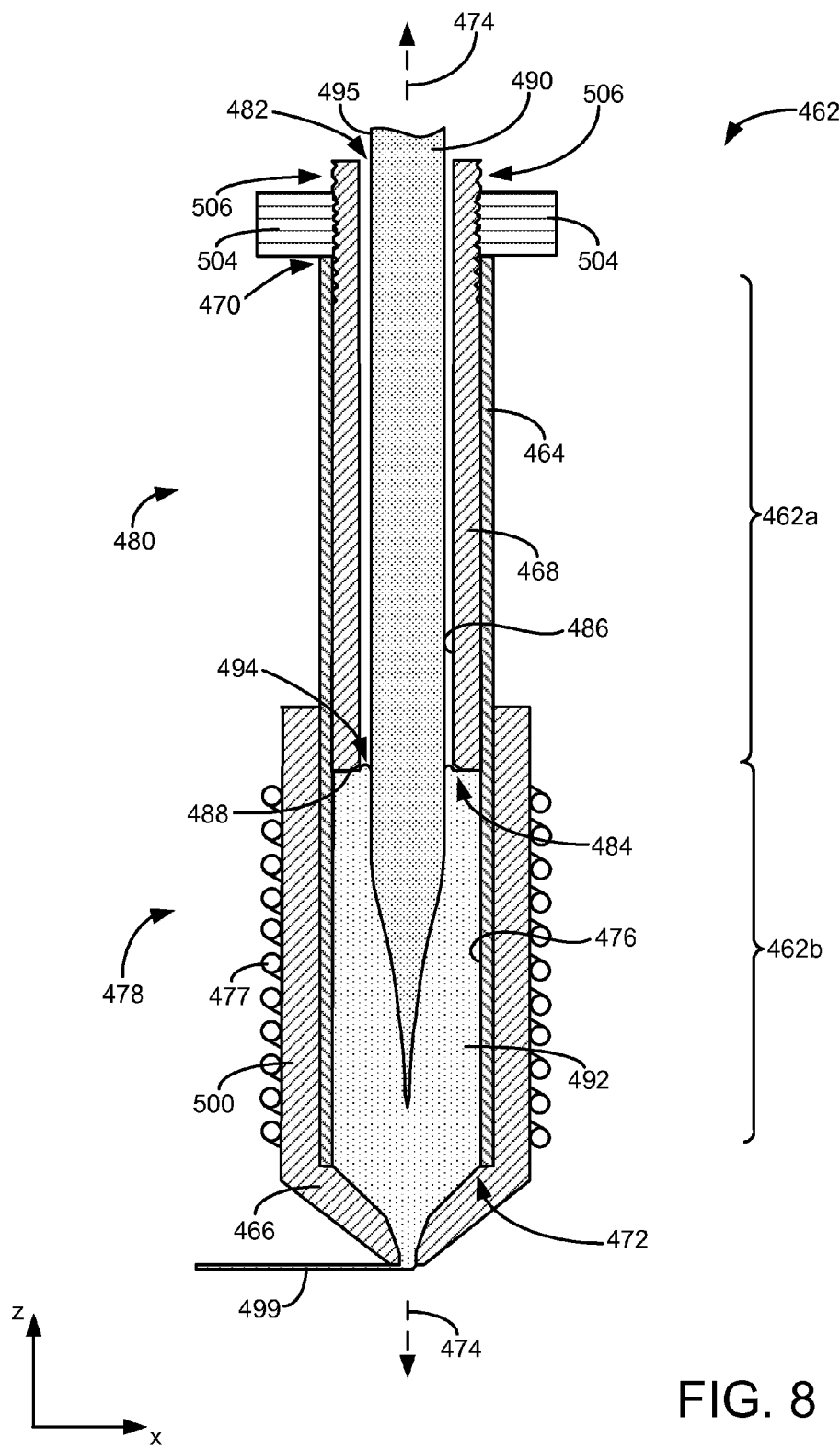
FIG. 8 is a side sectional view of a fourth alternative stepped liquefier assembly of the present disclosure in use with a filament, which includes a thin liquefier tube wall, a thermal sheath, a threaded hollow liner, and a rotary drive nut.

As shown in FIG. 8, liquefier assembly 462 includes liquefier tube 464, extrusion tip 466, and thermal sheath 500, which may function in the same manner as liquefier tube 264, extrusion tip 266, and thermal sheath 300 (shown in FIG. 6). Liquefier assembly 462 also includes hollow liner 468 and rotary drive nut 504. In this embodiment, hollow liner 468 includes threaded portion 506 adjacent to inlet end 482, and may be adjusted in height along longitudinal length 474 relative to liquefier tube 464. As shown, threaded portion 506 is engaged with rotary drive nut 504, which allows the height of hollow liner 468 to be adjusted relative to liquefier tube 464 by rotation of rotary drive nut 504.

The adjustment mechanism for hollow liner 468 accordingly adjusts the height of shoulder 488, thereby allowing the effective heated length of liquefier assembly 462 to be adjusted. This may be used for a variety of purposes, such as modifications to the response times for liquefier assembly 462, gas purging operations, and seam control in the 3D models and support structures (e.g., 3D model 24 and support structure 26).

With respect to modifications to the response times for liquefier assembly 462 while operating at steady state, liquefier assembly 462 has its maximum flow rate dictated by its heated length and the thermal diffusivity of the filament material being extruded, where the heated length is effectively determined by the height of meniscus 494. However, the small orifice diameter of extrusion tip 466 provides a flow resistance that is large compared to the flow resistance within liquefier tube 464. As a result, liquefier assembly 462 has a response time that increases with the square of the heated length of liquefier tube (i.e., the height of meniscus 494).

Therefore, the longer the heated length, the more difficult it may be to change the flow rate quickly (i.e., a slower response time). This slower response time accordingly slows down the build speed when building 3D models and support structures, particularly in regions in which numerous stops and starts are required. Stated another way, when an extrusion head (e.g., extrusion head 18) carrying liquefier assembly 462 moves quickly through interior fill patterns of a 3D model or support structure, a longer heated length is desired. Alternatively, when the extrusion head traces surface details with numerous stops and starts, a shorter heated length is desired. Accordingly, a long heated length of liquefier assembly 462 (i.e., a high shoulder 488 and meniscus 494) provides a high flow rate and a slow time response, while a short heated portion of liquefier assembly 462 (i.e., a low shoulder 488 and meniscus 494) provides a low flow rate and a fast time response.

Accordingly, by adjusting the height of shoulder 488 along longitudinal length 474 relative to liquefier tube 464 and extrusion tip 466, the effective heated length of liquefier assembly 462 may be adjusted to accommodate different aspects of a build operation. When an interior fill pattern is being built, rotary drive nut 504 may rotate and raise hollow liner 468 such that shoulder 488 is positioned at a desired height to retain meniscus 494. This results in a long heated length of liquefier assembly 462, which slows the response time, but provides faster flow rates.

Alternatively, when exterior surface details are being built, rotary drive nut 504 may rotate in the opposing direction and lower hollow liner 468 such that shoulder 488 is positioned at a desired lowered height to retain meniscus 494. This results in a shorter heated length of liquefier assembly 462, which slows the flow rates, but improves the response time for building the surface features. In an alternative embodiment, the effective heated length may also (or alternatively) be adjusted with the use of a multiple-zone liquefier arrangement, as disclosed in Swanson et al., U.S. patent application Ser. No. 12/841,341, entitled "Multiple-Zone Liquefier Assembly for Extrusion-Based Additive Manufacturing Systems".

While illustrated with rotary drive nut 504, the height of hollow liner 468 may be adjusted using a variety of different mechanisms. In one embodiment, the height of hollow liner 468 may be adjusted to function as a secondary pump to increase the extrusion rate of melt 492 through extrusion tip 466 for a short duration. For example, hollow liner 468 may be quickly lowered and raised back up to create a short pumping action. This is suitable for use in a variety of applications, such as for providing an initial spike in pumping action at the start point of a tool path.

In another alternative embodiment, rotary drive nut 504 may be replaced with a force gauge (not shown) that is operably secured to hollow liner 468 at inlet end 582. The force gauge may monitor the upward pressure applied to hollow liner 468, thereby measuring the pressure of melt 592 within liquefier assembly 562. Accordingly, the movement and compliance of hollow liner 568 provides a variety of functional and measurement-based operations that may be performed with liquefier assembly 562.

Figure 9:
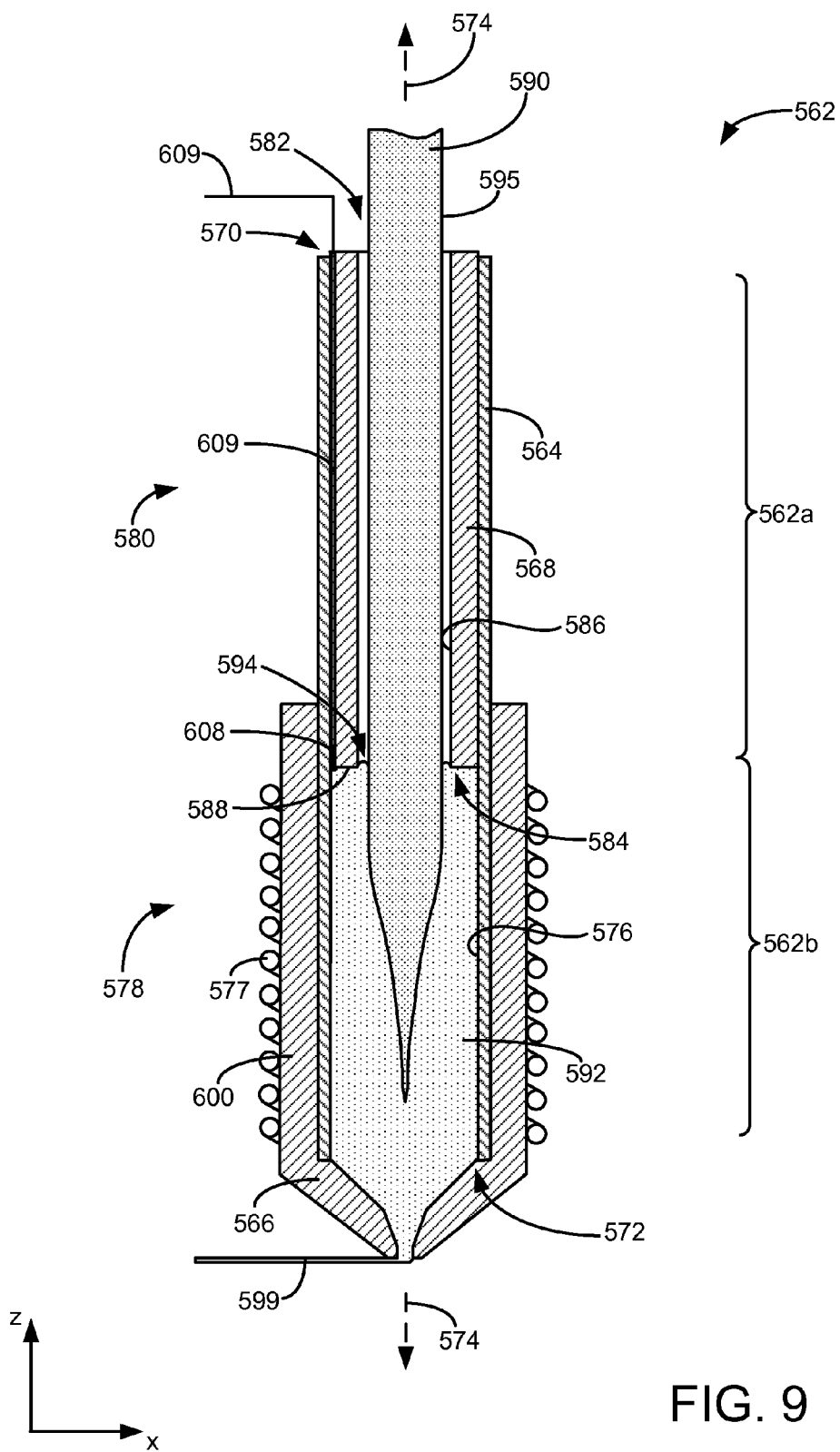
FIG. 9 is a side sectional view of a fifth alternative stepped liquefier assembly of the present disclosure in use with a filament, which includes a sensor retained between a hollow liner and a liquefier tube.

As shown in FIG. 9, liquefier assembly 562 includes liquefier tube 564, extrusion tip 566, hollow liner 568, and thermal sheath 600, which may function in the same manner as liquefier tube 264, extrusion tip 266, hollow liner 268, and thermal sheath 300 (shown in FIG. 6). Liquefier assembly 562 also includes sensor 608 and electrical connection 609, where sensor is retained between liquefier tube 564 and hollow liner 568 at shoulder 588. Electrical connection 609 is connected to sensor 608, and extends upward between liquefier tube 564 and hollow liner 568, and out of inlet end 570. As such, electrical connection 609 interconnects sensor 608 with an external electronic unit (not shown).

Sensor 608 may be any suitable sensor for monitoring thermal, flow, and pressure properties within liquefier assembly 562. For example, sensor 608 may be a thermocouple and/or a pressure transducer for measuring temperatures, pressures, and flow rates of melt 592. This embodiment is particularly suitable for use with hollow liner 568 derived from a material that is compliant, as discussed above. Retaining sensor 608 between liquefier tube 564 and hollow liner 568 allow real-time monitoring of melt 592, where the monitored properties may be relayed back to controller 28 to control operation of extrusion head 18.

While illustrated with a single sensor 608, the liquefier assemblies of the present disclosure may alternatively include multiple sensors 608. In an additional alternative embodiment, hollow liner 568 may include an additional lumen extending from inlet end 582 to outlet end 584, running parallel to the inner lumen of hollow liner 568. One or more sensors 608 and electrical connections 609 may then extend through the additional lumen, rather than between liquefier tube 564 and hollow liner 568.

Figure 10:
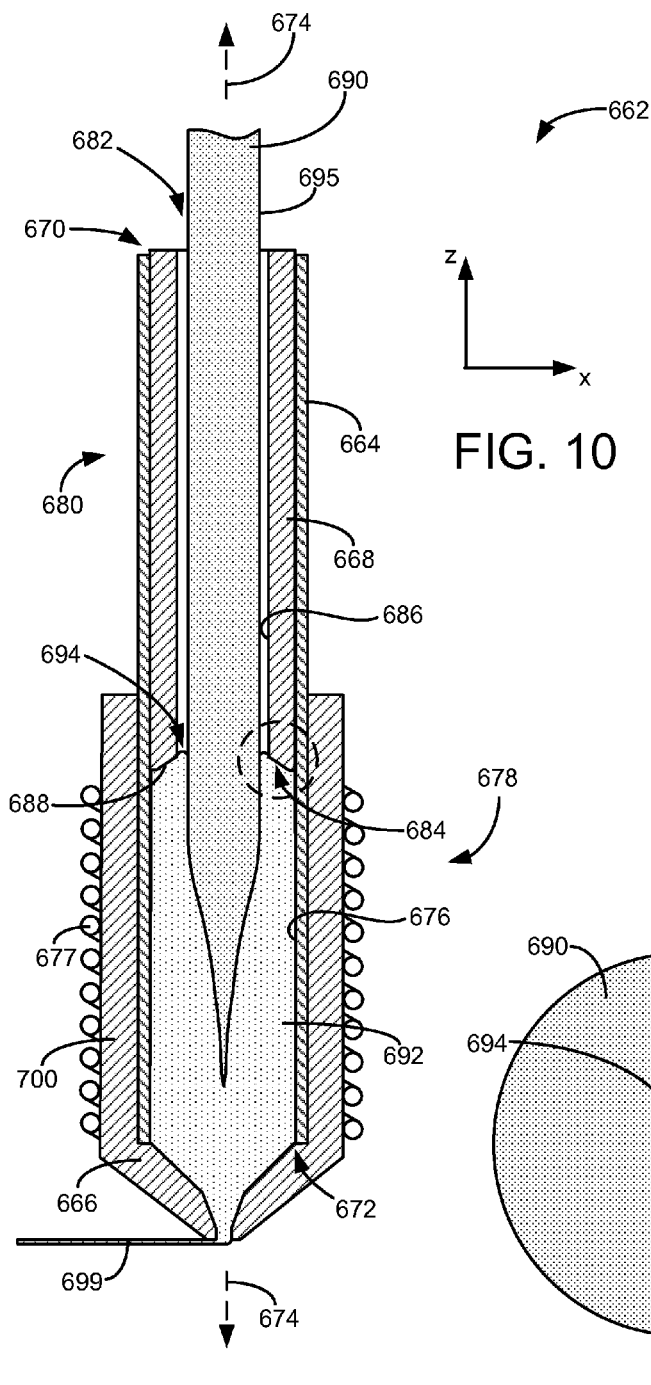
FIG. 10 is a side sectional view of a sixth alternative stepped liquefier assembly of the present disclosure in use with a filament, which includes a sloped shoulder.

As shown in FIG. 10, liquefier assembly 662 includes liquefier tube 664, extrusion tip 666, and thermal sheath 700, which may function in the same manner as liquefier tube 264, extrusion tip 266, and thermal sheath 300 (shown in FIG. 6). Liquefier assembly 662 also includes hollow liner 668 having sloped shoulder 688.

As discussed above, in some situations, gas may be generated in melt 692, typically from thermal degradation of some filament materials. This generated gas may collect in the annulus defined by the shoulder of the hollow liner (e.g., shoulder 88 of liquefier assembly 62, shown in FIGS. 3 and 4), which can result in oozing of the extruded material at the ends of the extruded roads (e.g., extruded road 99, shown in FIG. 4).

Figure 11:
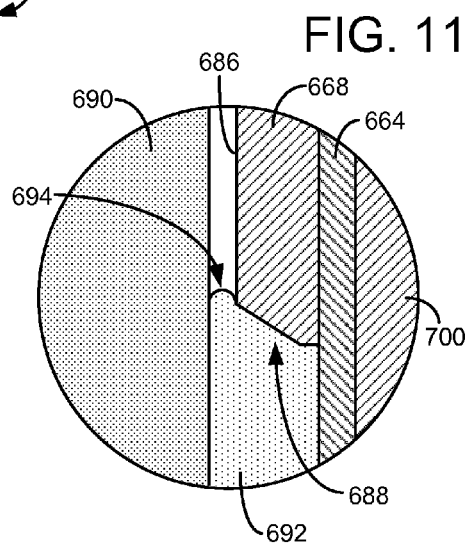
FIG. 11 is an expanded view of section 11 taken in FIG. 10, further illustrating the sloped shoulder.

As shown in FIG. 11, to reduce or prevent build up of such generated gas, shoulder 688 exhibits a sloped profile relative to the cross section of liquefier assembly 662, where the cross section of liquefier assembly 662 is taken perpendicular to longitudinal axis 674. The sloped profile of shoulder 688 allows any generated gas to pass upward through upper portion 662a, and out of inlet end 682. While illustrated with a particular sloped profile, shoulder 688 may alternatively include different slope angles and/or curved profiles to assist in degassing liquefier assembly 662.

Figure 12A:
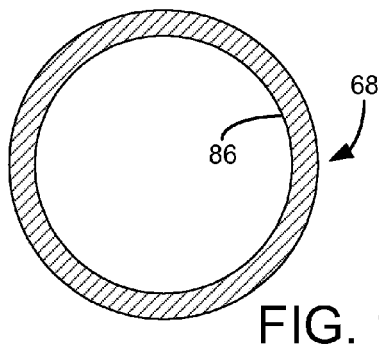
FIG. 12A is a sectional view of section 12A-12A taken in FIG. 3, illustrating a hollow liner having an annular cross-sectional geometry.
Figure 12B:
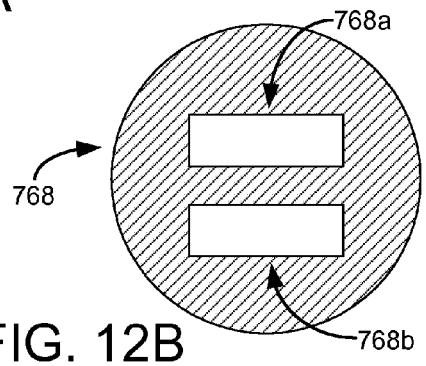
FIG. 12B is a first alternative sectional view of section 12A-12A taken in FIG. 3, illustrating a hollow liner having a non-annular cross-sectional geometry with a pair of rectangular apertures.
Figure 12C:
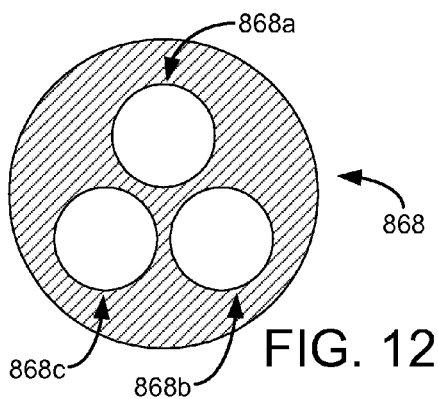
FIG. 12C is a second alternative sectional view of section 12A-12A taken in FIG. 3, illustrating a hollow liner having a non-annular cross-sectional geometry with multiple circular apertures.
Figure 12D:
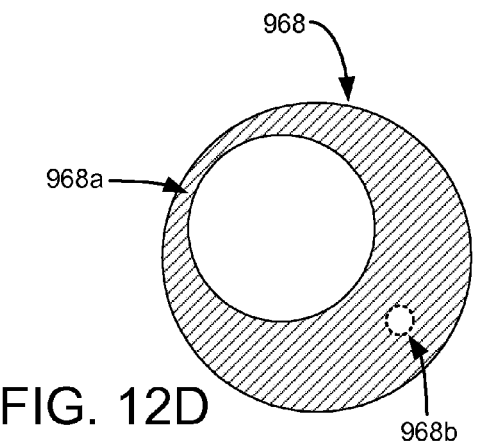
FIG. 12D is a third alternative sectional view of section 12A-12A taken in FIG. 3, illustrating a hollow liner having a non-annular cross-sectional geometry with an off-axis aperture.

FIGS. 12A-12D illustrate suitable cross-sectional geometries for hollow liner 68, where, in these embodiments, the outer surface of hollow liner 68 retains a circular geometry (shown in FIGS. 3 and 4). While the following discussion of the suitable cross-sectional geometries is made with reference to hollow liner 68, the suitable cross-sectional geometries are also applicable to any hollow liner of the present disclosure (e.g., hollow liners 68, 168, 268, 368, 468, 568, and 668). FIG. 12A is a sectional view of section 12A-12A taken in FIG. 3, illustrating an annular cross-sectional geometry for use with a cylindrical filament (e.g., filament 90), which provides a circular hollow cross-sectional area for inner surface 86. However, as shown in FIGS. 12B-12D, hollow liners having non-annular cross-sectional geometries may be used with liquefier tube 64 (and/or liquefier tubes 164, 264, 364, 464, 564, and 664) to receive a variety of different filament cross-sectional shapes.

As shown in FIG. 12B, hollow liner 768 includes a pair of rectangular apertures 768a and 768b, which are each configured to receive a ribbon filament. Examples of suitable ribbon filaments for use in this embodiment include those disclosed in Batchelder et al., U.S. Patent Application Publication No. 2011/0076496. Since the meniscus has little tendency to climb upward, one of the pair of ribbon filaments may be fed while the other remains stationary (e.g., for a pair of modeling and support materials). While illustrated with a pair of rectangular apertures 768a and 768b, hollow liner 768 may alternatively include a single rectangular aperture, or three or more rectangular apertures.

As shown in FIG. 12C, hollow liner 868 includes three apertures 868a-868c, each of which are configured to receive a cylindrical filament. This embodiment is suitable for feeding filaments of different materials (e.g., different colors) into the liquefier assembly, which may then be melted and at least partially blended together before extrusion. Examples of suitable design arrangements and materials for use in this embodiment include those disclosed in Zinniel et al., U.S. Patent Application Publication No. 2010/0327479.

As shown in FIG. 12D, hollow liner 968 includes an off-axis aperture 968a, which may improve the tendency of the filament to compress into a spiral near inner surface 76 in heated zone 78 as it melts, thereby increasing the heat transfer rate. Axially asymmetric feed can encourage helical flow in the heated portion.

As discussed above, in some embodiments, the hollow liner may include an additional lumen for extending sensors through the hollow liner. The off-axis geometry of hollow liner 968 is suitable for providing such an additional lumen, such as aperture 968b (shown with dashed lines). As such, one or more sensors and electrical connections may then extend through aperture 968b to monitor various thermal, flow, and pressure-based properties.

Figure 13:
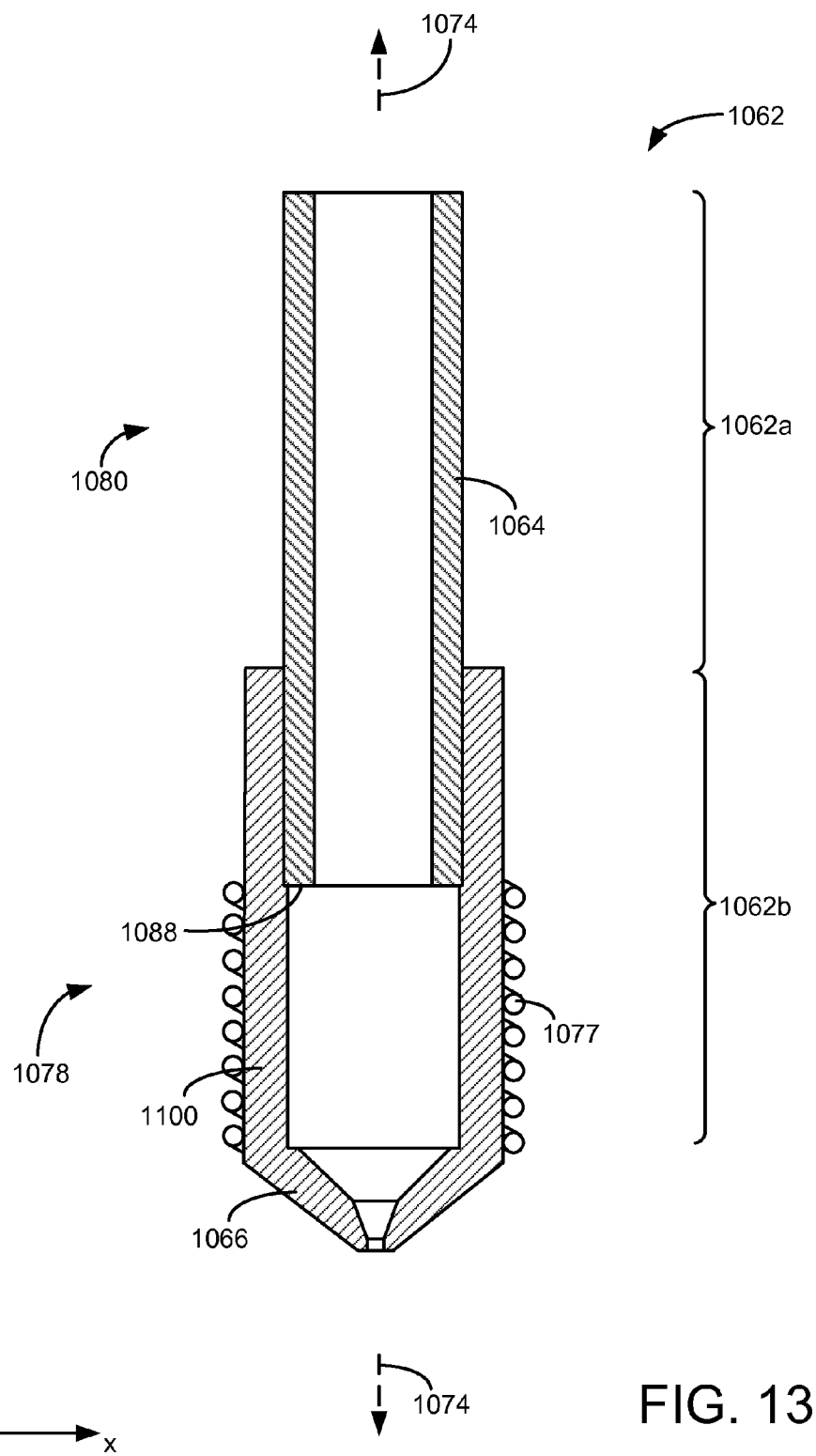
FIG. 13 is a sectional view of a seventh alternative stepped liquefier assembly of the present disclosure, which includes a liquefier tube retained within a thermal sheath.

FIG. 13 illustrates liquefier assembly 1062, which is an additional alternative to liquefier assembly 62 (shown in FIGS. 3 and 4), where corresponding reference labels are increased by "1000". As shown in FIG. 13, liquefier assembly 1062 includes liquefier tube 1064, extrusion tip 1066, and thermal sheath 1100, which may function in a similar manner as liquefier tube 264, extrusion tip 266, and thermal sheath 300 (shown in FIG. 6). In this embodiment, however, liquefier tube 1064 itself defines upstream portion 1062a, and liquefier sheath 1100 defines downstream portion 1062b. Suitable materials for liquefier tube 1064 include those discussed above for liquefier tube 64 (shown in FIGS. 3 and 4), such as graphite.

Suitable inner diameters for liquefier tube 1064 and upstream portion 1062a include those discussed above for inner diameter 86d of hollow liner 68 (shown in FIG. 3). Correspondingly, suitable inner diameters for thermal sheath 1100 and downstream portion 1062b include those discussed above for inner diameter 76d of liquefier tube 64 (shown in FIG. 3). The use of thermal sheath 1100 allows extrusion tip 1066 to laterally support liquefier tube 1064 from the hydraulic pressures exerted by the viscosity pump action, in addition to providing good thermal spreading and heat control. Accordingly, liquefier assembly 1062 is suitable for use in high-temperature environments, such as those at which a fluoropolymer hollow liner may not be thermally stable.

The above-discussed embodiments of the liquefier assemblies of the present disclosure are described as having cylindrical geometries. As discussed above, in alternative embodiments, liquefier assemblies 62, 162, 262, 362, 462, 562, 662, and 1062 may exhibit non-cylindrical geometries (e.g., rectangular geometries). Examples of suitable geometries for liquefier assemblies 62, 162, 262, 362, 462, 562, 662, and 1062 include those disclosed in Batchelder et al., U.S. Patent Application Publication Nos. 2011/0074065 and 2011/0076496.

In these embodiments, the above-discussed "diameters" for the liquefier tubes (e.g., liquefier tube 64, 164, 264, 364, 462, 562, 662, and 1062), the hollow liners (e.g., hollow liners 68, 168, 268, 368, 468, 568, and 1068), the filaments (e.g., filaments 90, 190, 290, 390, 490, 590, 690, and 1090) may be replaced with corresponding non-cylindrical geometries based on the respective cross-sectional areas. As discussed above, the average inner cross-sectional area for a liquefier assembly upstream portion (e.g., upstream portions 62a, 162a, 262a, 362a, 462a, 562a, 662a, and 1062a) is greater than the average inner cross-sectional area for the corresponding liquefier assembly downstream portion (e.g., downstream portions 62b, 162b, 262b, 362b, 462b, 562b, 662b, and 1062b).

Furthermore, the features of the above-discussed embodiments may be combined to attain additional alternative embodiments. For example, the inner coating embodiment of hollow liner 168 (shown in FIG. 5) may also be used in combination with liquefier assemblies 262, 362, 462, 562, 662, and 1062; lower tube 402 (shown in FIG. 7) may also be used in combination with liquefier assemblies 62, 162, 262, 462, 562, 662, and 1062; the hollow liner adjustment mechanism (e.g., rotary drive nut 504, shown in FIG. 8) may also be used in combination with liquefier assemblies 62 and 162; the sensor-containing embodiment of liquefier assembly 562 (shown in FIG. 9) may also be used in combination with liquefier assemblies 62 and 162; the sloped-shoulder embodiment of liquefier assembly 662 (shown in FIGS. 10 and 11) may also be used in combination with liquefier assemblies 62 and 162; and combinations thereof.

The consumable materials (e.g., filaments) for use in the liquefier assemblies of the present disclosure (e.g., liquefier assemblies 62, 162, 262, 362, 462, 562, 662, and 1062) may include a variety of extrudable modeling and support materials for respectively building 3D model 24 and support structure 26. Suitable modeling materials for use with the lined liquefier assemblies of the present disclosure include polymeric and metallic materials. In some embodiments, suitable modeling materials include materials having amorphous properties, such as thermoplastic materials, amorphous metallic materials, and combinations thereof. Examples of suitable thermoplastic materials for the consumable materials include acrylonitrile-butadiene-styrene (ABS) copolymers, polycarbonates, polysulfones, polyethersulfones, polyphenylsulfones, polyetherimides, amorphous polyamides, modified variations thereof (e.g., ABS-M30 copolymers), polystyrene, and blends thereof. Examples of suitable amorphous metallic materials include those disclosed in Batchelder, U.S. Patent Application Publication No. 2009/0263582.

Suitable support materials for use with the liquefier assemblies of the present disclosure include polymeric materials. In some embodiments, suitable support materials include materials having amorphous properties (e.g., thermoplastic materials) and that are desirably removable from the corresponding modeling materials after 3D model 28 and support structure 30 are built. Examples of suitable support materials for the filaments include water-soluble support materials commercially available under the trade designations "WATERWORKS" and "SOLUBLE SUPPORTS" from Stratasys, Inc., Eden Prairie, Minn.; break-away support materials commercially available under the trade designation "BASS" from Stratasys, Inc., Eden Prairie, Minn., and those disclosed in Crump et al., U.S. Pat. No. 5,503,785; Lombardi et al., U.S. Pat. Nos. 6,070,107 and 6,228,923; Priedeman et al., U.S. Pat. No. 6,790,403; and Hopkins et al., U.S. Patent Application Publication No. 2010/0096072.

The compositions of the modeling and support materials may also include additional additives, such as plasticizers, rheology modifiers, inert fillers, colorants, stabilizers, and combinations thereof. Examples of suitable additional plasticizers include dialkyl phthalates, cycloalkyl phthalates, benzyl and aryl phthalates, alkoxy phthalates, alkyl/aryl phosphates, polyglycol esters, adipate esters, citrate esters, esters of glycerin, and combinations thereof. Examples of suitable inert fillers include calcium carbonate, magnesium carbonate, glass spheres, graphite, carbon black, carbon fiber, glass fiber, talc, wollastonite, mica, alumina, silica, kaolin, silicon carbide, composite materials (e.g., spherical and filamentary composite materials), and combinations thereof. In embodiments in which the composition includes additional additives, examples of suitable combined concentrations of the additional additives in the composition range from about 1% by weight to about 10% by weight, with particularly suitable concentrations ranging from about 1% by weight to about 5% by weight, based on the entire weight of the composition.

Although the present disclosure has been described with reference to several embodiments, workers skilled in the art will recognize that changes may be made in form and detail without departing from the spirit and scope of the disclosure.

The invention claimed is:

1. A liquefier for use in an extrusion-based additive manufacturing system, the liquefier comprising:
    an upstream portion configured to receive a supply of consumable filament wherein the upstream portion has a substantially smooth upstream inner surface having an upstream inner cross-sectional area;
    a downstream portion configured to receive the consumable filament from the upstream portion wherein the downstream portion has a substantially smooth downstream inner surface having a downstream inner cross-sectional area wherein the downstream inner cross-sectional areas is greater than the upstream inner cross-sectional area;
    a shoulder located at an intersection of the upstream portion and the downstream portion wherein the shoulder of the liquefier is configured to restrict upward and downward movements of a melt meniscus of the filament; and
    a nozzle attached to the downstream portion proximate a distal end wherein the nozzle comprises a substantially smooth tapered surface that transitions the substantially smooth downstream inner surface proximate the distal end of the downstream portion to an extrusion port configured to extrude molten consumable material, wherein the extrusion port has a cross-sectional area that is less than the upstream inner cross-sectional area; and
    a heater configured to conduct heat to the received filament in the downstream portion to produce a molten material having a meniscus; and
    a drive mechanism configured to feed the supply of consumable filament to the upstream portion of the liquefier.

2. The liquefier of claim 1, wherein the inner surface of the upstream portion comprises a material providing the inner surface with a lower coefficient of friction than the substantially smooth downstream inner surface of the downstream portion.

3. The liquefier of claim 2, wherein the inner surface of the upstream portion comprises a fluorinated polymer.

4. The liquefier of claim 1, wherein the upstream portion comprises a plurality of apertures each configured to receive a consumable material and wherein the plurality of apertures each has an upstream inner surface with an upstream average inner cross-sectional area.

5. The liquefier of claim 4, wherein the downstream portion comprises a downstream inner surface having a downstream average inner cross-sectional area that is greater than a sum of the upstream average inner cross-sectional areas of the plurality of apertures.

6. The liquefier of claim 1, wherein the upstream portion and the downstream portion both have a non-cylindrical geometry.

7. The liquefier of claim 1, wherein the liquefier further comprises a hollow tube that provide an inner surface in the upstream portion having a low coefficient of friction with respect to the received filament.

8. A liquefier assembly for use in an extrusion-based additive manufacturing system, the liquefier assembly comprising:
    a liquefier comprising:
        a main body having a first end and a second end;
        a flow channel extending from the first end to the second end and having a shoulder positioned between the first end and the second end, the shoulder defining an upstream portion having a substantially smooth inner upstream surface and a downstream portion having a substantially smooth inner downstream surface wherein upstream portion has an upstream inner cross-sectional area and wherein the downstream portion has a downstream inner cross-sectional area and wherein the downstream inner cross-sectional areas is greater than the upstream inner cross-sectional area wherein the shoulder of the liquefier is configured to restrict upward and downward movement of the meniscus while the drive mechanism feeds the filament; and a heater configured to conduct heat to the received filament in the downstream portion to produce a molten material having a meniscus; and a nozzle attached to the main body proximate a second end wherein the nozzle comprises a substantially smooth tapered surface that transitions the substantially smooth downstream inner surface proximate the second end to an extrusion port in communication with the flow channel, the extrusion port having a cross-sectional area that is less than the upstream inner cross-sectional area; and a drive mechanism configured to feed the supply of consumable filament to the upstream portion of the liquefier.

9. The liquefier assembly of claim 8, wherein the substantially smooth inner surface of the upstream portion has a lower coefficient of friction than the substantially smooth inner downstream surface of the downstream portion.

10. A liquefier for use in an extrusion-based additive manufacturing system, the liquefier comprising:

a liquefier tube configured to receive a supply of a consumable filament and having an upstream portion and a downstream portion wherein the downstream portion comprises a substantially smooth inner downstream surface;

a shoulder located between the upstream portion and the downstream portion of the liquefier tube;

a hollow liner disposed at least partially within the liquefier tube and wherein the hollow liner has a substantially smooth inner liner surface and a distal end that defines the shoulder and wherein the hollow liner provides the liquefier with an upstream cross-sectional area less than the cross-sectional area of the downstream portion of the liquefier; and a nozzle attached to the downstream portion proximate a distal end wherein the nozzle comprises a substantially smooth tapered surface that transitions the substantially smooth downstream inner surface proximate the distal end of the downstream portion to an extrusion port, the extrusion port having a cross-sectional area that is less than the upstream cross-sectional area.

11. The liquefier of claim 10, wherein the shoulder of the liquefier is configured to restrict upward and downward movements of a melt meniscus of the filament.

12. The liquefier of claim 10, wherein the inner surface of the hollow liner has a surface having a lower coefficient of friction than the substantially smooth downstream surface of the liquefier tube.

13. The liquefier of claim 10, wherein the shoulder is positioned at the distal end of the hollow liner, the shoulder having a sloped profile relative to a cross-section of the liquefier assembly, when the cross-section is taken perpendicular to a longitudinal axis of the liquefier assembly.

14. The liquefier of claim 10, wherein the hollow liner comprises a fluorinated polymer.

15. The liquefier of claim 10, wherein the upstream portion comprises a plurality of apertures each configured to receive a consumable material and wherein the plurality of apertures each has an upstream inner surface with an upstream average inner cross-sectional area.

16. The liquefier of claim 15, wherein the downstream portion comprises a downstream inner surface having a downstream average inner cross-sectional area that is greater than a sum of the upstream average inner cross-sectional areas of the plurality of apertures.

17. The liquefier of claim 10, wherein the upstream portion and the downstream portion both have a non-cylindrical geometry.

18. The liquefier of claim 8, wherein the substantially smooth inner upstream surface of the upstream portion comprises a fluorinated polymer.

19. The liquefier of claim 8, wherein the upstream portion and the downstream portion both have a non-cylindrical geometry.

* * * * *